United States Patent
McCarville et al.

(10) Patent No.: US 9,463,864 B1
(45) Date of Patent: Oct. 11, 2016

(54) RADIUS FILLER CONTAINING VERTICAL PLY STACKS AND THIN PLIES

(71) Applicant: The Boeing Company, Chicago, IL (US)

(72) Inventors: Douglas A. McCarville, Bonney Lake, WA (US); Jordan O. Birkland, Lynnwood, WA (US); Ryan S. Tidwell, Seattle, WA (US); Juan C. Guzman, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/811,110

(22) Filed: Jul. 28, 2015

(51) Int. Cl.
*B32B 3/08* (2006.01)
*B64C 1/00* (2006.01)
*B29C 70/30* (2006.01)
*B29L 31/30* (2006.01)

(52) U.S. Cl.
CPC ............... *B64C 1/00* (2013.01); *B29C 70/30* (2013.01); *B29L 2031/3085* (2013.01); *B64C 2001/0072* (2013.01)

(58) Field of Classification Search
CPC .... B32B 3/08; B32B 3/28; Y10T 428/24174
USPC .......................................... 428/105, 113, 119
See application file for complete search history.

(56) References Cited

U.S. PATENT DOCUMENTS

| | | | |
|---|---|---|---|
| 4,789,594 A | 12/1988 | Stawski | |
| 5,639,535 A | 6/1997 | McCarville | |
| 6,562,436 B2 | 5/2003 | George et al. | |
| 6,689,448 B2 | 2/2004 | George et al. | |
| 6,709,538 B2 | 3/2004 | George et al. | |
| 8,211,530 B2 | 7/2012 | Mead et al. | |
| 8,591,685 B2 | 11/2013 | Anderson et al. | |
| 8,943,697 B2 | 2/2015 | Kamaraj et al. | |
| 2009/0317587 A1 | 12/2009 | Deobald et al. | |
| 2011/0143081 A1 | 6/2011 | Fritz et al. | |
| 2012/0074265 A1 | 3/2012 | Hallander et al. | |
| 2012/0237736 A1 | 9/2012 | Blot et al. | |
| 2014/0034236 A1 | 2/2014 | Guzman et al. | |

OTHER PUBLICATIONS

U.S. Appl. No. 14/244,690, filed Apr. 3, 2014.

*Primary Examiner* — Alexander Thomas

(57) ABSTRACT

A radius filler for a composite assembly may include a pair of vertical ply stacks positioned in back-to-back relation. Each one of the vertical ply stacks may be formed of one or more thick plies of composite material formed in an L-shaped cross-section having a vertical leg and a lateral leg interconnected by a stack radius and defining a crescent region. At least one of the crescent regions may include one or more thin plies of composite material positioned adjacent to a stack radius inner surface. Each one of the thin plies may have a ply thickness that is less than the ply thickness of the thick plies.

26 Claims, 12 Drawing Sheets

RADIUS FILLER CONTAINING VERTICAL PLY STACKS AND THIN PLIES

FIELD

The present disclosure relates generally to manufacturing of composite assemblies and, more particularly, to a system and method for reducing residual stress in radius fillers.

BACKGROUND

Composite structures are used in a wide variety of applications due to their high strength-to-weight ratio, improved corrosion resistance, and other favorable properties. In aircraft construction, composites are used in increasing quantities to form the fuselage, wings, horizontal and vertical stabilizer, and other components. For example, the horizontal stabilizer of an aircraft may be formed of composite skin panels co-bonded to internal composite structures such as composite stiffeners or spars. The composite spars may extend from the root to the tip of the horizontal stabilizer and may generally taper in thickness along a spanwise direction to improve the stiffness characteristics of the horizontal stabilizer and reduce weight. Composite spars may also include localized increases in the composite thickness such as where the spar attaches to other structures or components.

Composite stiffeners or spars may be provided in a variety of cross-sectional shapes. For example, a composite spar or stiffener may be formed in an I-beam shape by bonding together the vertical webs of two composite C-channels in back-to-back arrangement. Each one of the C-channels may have horizontal flanges extending outwardly from the upper and lower sides of the web. Each horizontal flange may transition into the web at a radiused web-flange transition or stiffener radius. When the C-channels are joined back-to-back to form the I-beam shape, the back-to-back stiffener radii result in a lengthwise notch region along each one of the upper and lower sides of the I-beam. To improve the strength, stiffness, and durability of a composite structure, the notch regions may be filled with a radius filler formed of composite material.

Unfortunately, existing radius fillers suffer from several drawbacks that detract from their overall utility. For example, existing radius fillers may exhibit microcracking during manufacturing such as during cool-down from curing or during trimming operations. Microcracking may also occur during service under certain loading conditions and/or during thermal cycling. Microcracking in conventional radius fillers may be difficult to detect during routine non-destructive inspection due to the orientation of the microcracks which may be perpendicular to the composite skin. Furthermore, conventional radius fillers may exhibit a relatively low pull-off strength at the bond between the I-beam and the skin panel.

A further drawback associated with conventional radius fillers is the inability to vary the mechanical properties of the radius filler in multiple directions as may be desired in composite assemblies that are subjected to different loading conditions at different locations. For example, a homogenous radius filler formed of bundles of unidirectional fiber tows cannot be configured to have relatively high stiffness at one lengthwise location of the radius filler and have high strain capability (e.g., relatively low stiffness) at another lengthwise location.

As can be seen, there exists a need in the art for a radius filler that minimizes microcracking during manufacturing, in service, and during thermal cycling, and which provides favorable pull-off strength. In addition, there exists a need in the art for a radius filler that provides the capability to tailor the mechanical properties of the radius filler in one or more directions.

SUMMARY

The above-noted needs associated with radius fillers are specifically addressed and alleviated by the present disclosure which provides a radius filler having a pair of vertical ply stacks positioned in back-to-back relation to one another. Each one of the vertical ply stacks may be formed of one or more thick plies of composite material formed in an L-shaped cross-section having a vertical leg and a lateral leg interconnected by a stack radius and defining a crescent region. At least one of the crescent regions may include one or more thin plies of composite material positioned adjacent to a stack radius inner surface. Each one of the thin plies may have a ply thickness that is less than the ply thickness of the thick plies.

Also disclosed is an aircraft having a composite structure containing a radius filler. The radius filler may include a pair of vertical ply stacks positioned in back-to-back arrangement. Each one of the vertical ply stacks may include one or more thick plies of composite material formed in an L-shaped cross-section having a vertical leg and a lateral leg interconnected by a stack radius and defining a crescent region. At least one of the crescent regions may include a thin ply stack of thin plies of composite material positioned adjacent to a stack radius inner surface. Each one of the thin plies may have a ply thickness that is less than the ply thickness of the thick plies.

Also disclosed is a method of forming a radius filler. The method may include positioning a pair of vertical ply stacks in back-to-back arrangement. Each one of the vertical ply stacks may include one or more thick plies of composite material formed in an L-shaped cross-section having a vertical leg and a lateral leg interconnected by a stack radius and defining a crescent region. The method may include positioning one or more thin plies of composite material in the crescent region adjacent to the stack radius inner surface of at least one of the vertical ply stacks. Each one of the thin plies may have a ply thickness that is less than the ply thickness of the thick plies.

In a further embodiment, disclosed is a method of forming a composite assembly including installing a radius filler in a notch region of a composite assembly. The notch region may be bounded by opposing stiffener radii of back-to-back stiffener elements formed of laminated composite plies. The radius filler may include a pair of vertical ply stacks positioned in back-to-back relation to one another. Each one of the vertical ply stacks may be formed of one or more thick plies of composite material formed in an L-shaped cross-section having a vertical leg and a lateral leg interconnected by a stack radius and defining a crescent region. At least one of the crescent regions may include one or more thin plies of composite material positioned adjacent to a stack radius inner surface. Each one of the thin plies may have a ply thickness less than the ply thickness of the thick plies.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Figure 1:
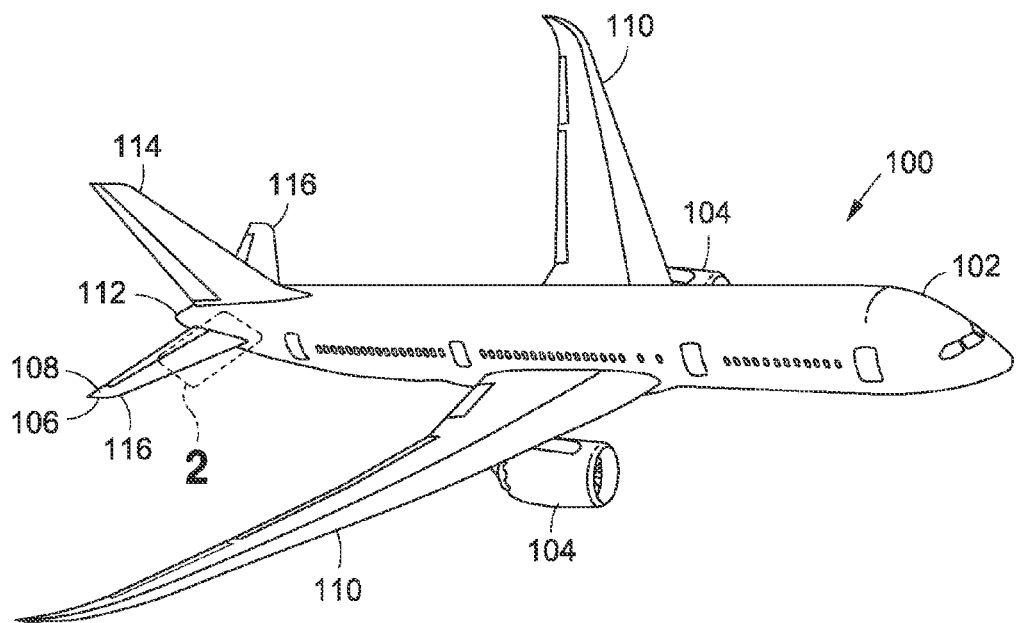
FIG. 1 is a perspective view of an aircraft.

Referring now to the drawings wherein the showings are for purposes of illustrating various embodiments of the present disclosure, shown in FIG. 1 is a perspective view of an aircraft 100. The aircraft 100 may include a fuselage 102 extending from a forward end to an aft end of the aircraft 100. The aft end may include an empennage 112 having one or more tail surfaces such as a vertical stabilizer 114 and a pair of horizontal stabilizers 116. The aircraft 100 may further include a pair of wings 110 extending outwardly from the fuselage 102, and one or more propulsion units 104 that may be mounted to the wings 110. The fuselage 102, the wings 110, the vertical stabilizer 114, the horizontal stabilizers 116, and/or other aircraft components may be formed as composite assemblies fabricated from composite material 108 such as composite plies 352 (FIG. 3) comprised of fiber-reinforced polymer matrix material.

Figure 2:
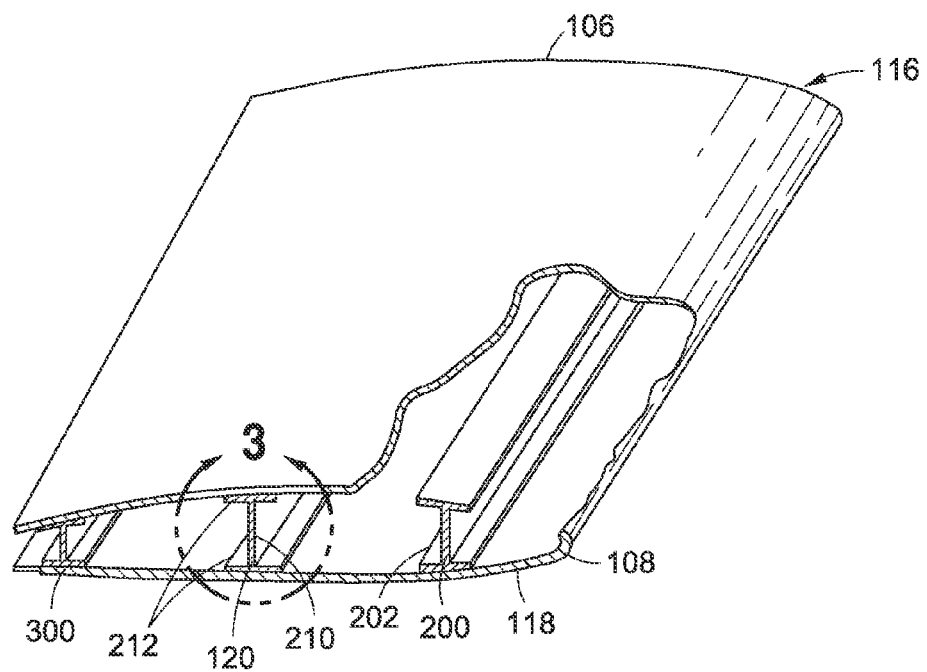
FIG. 2 is a perspective view of a horizontal stabilizer taken along line 2 of FIG. 1.

FIG. 2 is a perspective view of a portion of a horizontal stabilizer 116 of the aircraft 100 of FIG. 1. The horizontal stabilizer 116 may include one or more composite skin panels 118 that may be co-cured or co-bonded to one or more internal composite components. For example, the composite skin panels 118 may be co-cured or co-bonded to one or more internal composite spars 120 which may extend along an outboard direction from a root to a tip of the horizontal stabilizer 116. In the example shown, the composite spars 120 of the horizontal stabilizer 116 are configured as I-beam stiffeners 202 having upper and lower stiffener flanges 212 interconnected by one or more stiffener webs 210. However, the composite spars 120 and/or other composite stiffeners 200 may be provided in any one of a variety of different cross-sectional shapes, and are not limited to an I-beam stiffener.

Figure 11:
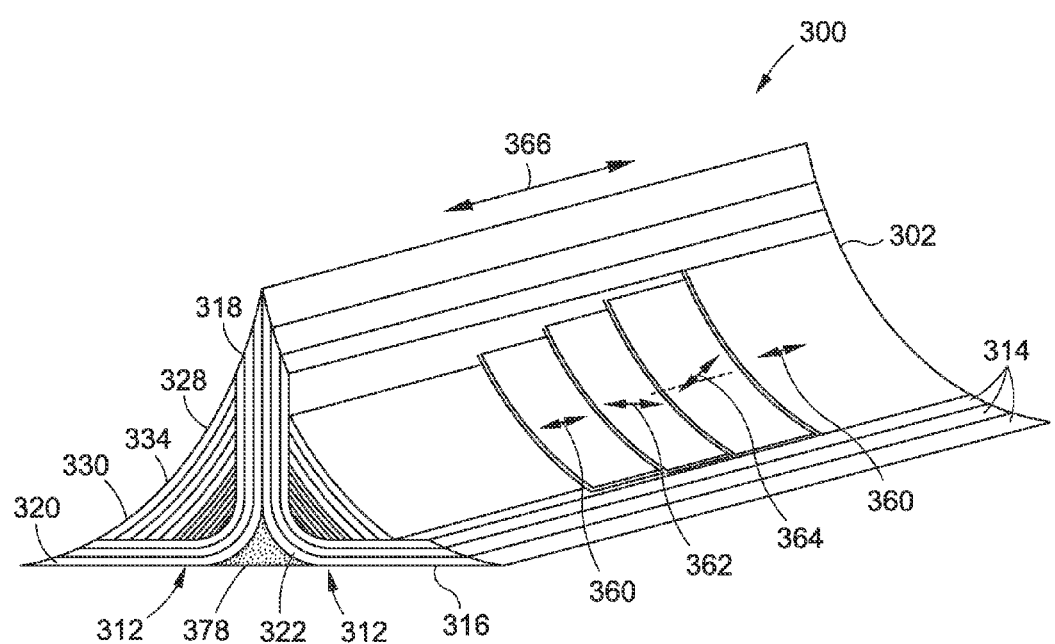
FIG. 11 is a perspective view of an example of a radius filler including a thin ply stack containing alternating thin plies having fiber orientations that are non-parallel to a lengthwise direction of the radius filler.

In some examples, such composite stiffeners may be tapered (e.g., in height) and/or may have a generally reducing thickness of the stiffener flanges 212 and/or stiffener web 210 (FIG. 2) along the spanwise direction as a means to taper (e.g., gradually reduce) the bending stiffness of the composite stiffener 200 (FIG. 2) along an outboard direction. In addition, such composite stiffeners 200 may include localized changes in the thickness of the stiffener flanges 212 and/or stiffener web 210 along the lengthwise direction 366 (FIG. 11). For example, composite stiffeners 200 may include localized increases in the thickness of the stiffener flanges 212 and/or stiffener web 210 at high-stress locations or at locations where other composite structures or system components (e.g., brackets—not shown) may be joined (e.g., adhesively bonded and/or mechanically fastened) to the composite stiffener 200.

Figure 3:
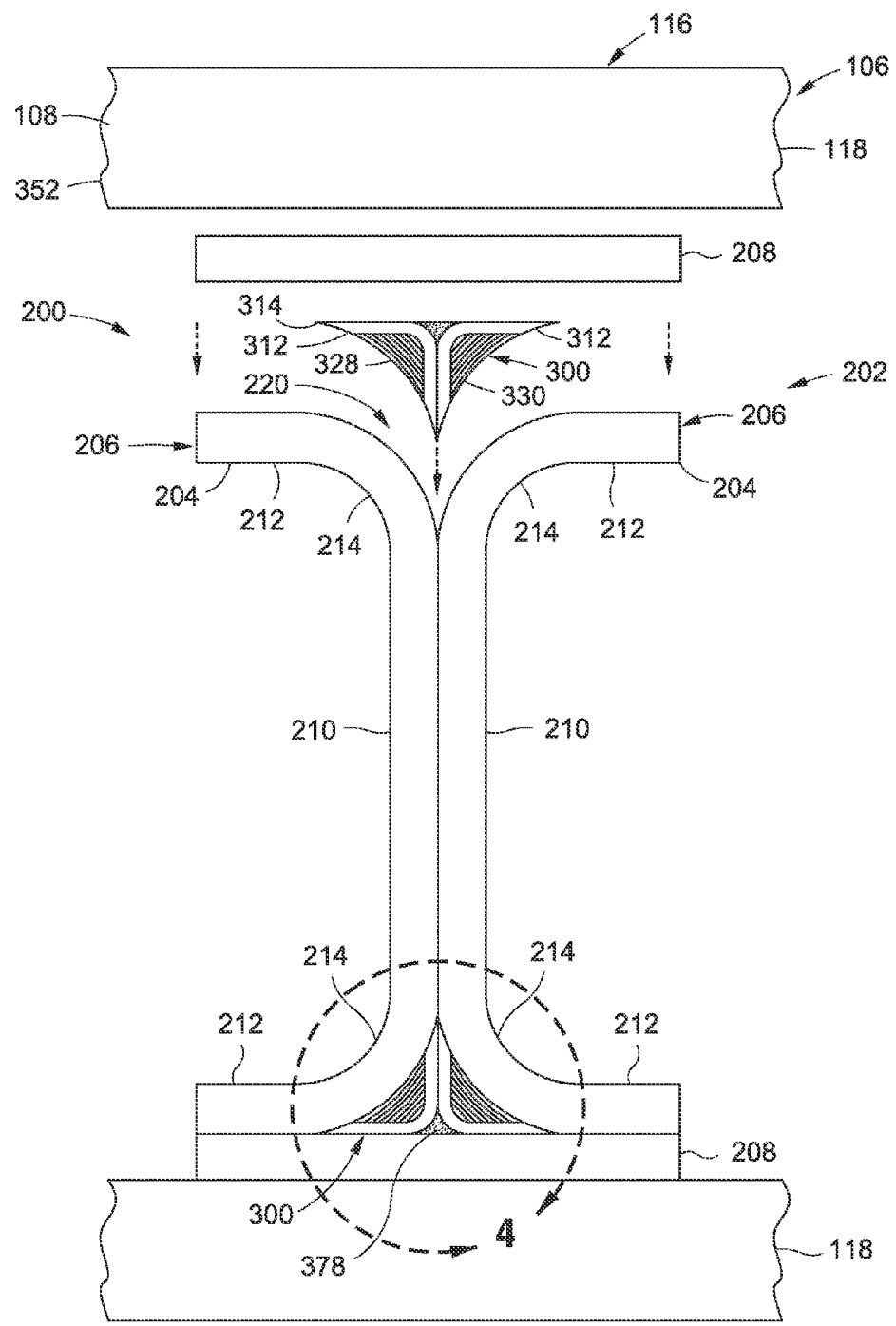
FIG. 3 is a side view of a composite stiffener taken along line 3 of FIG. 2 and illustrating the composite stiffener configured as an I-beam stiffener bonded to upper and lower skin panels.
Figure 4:
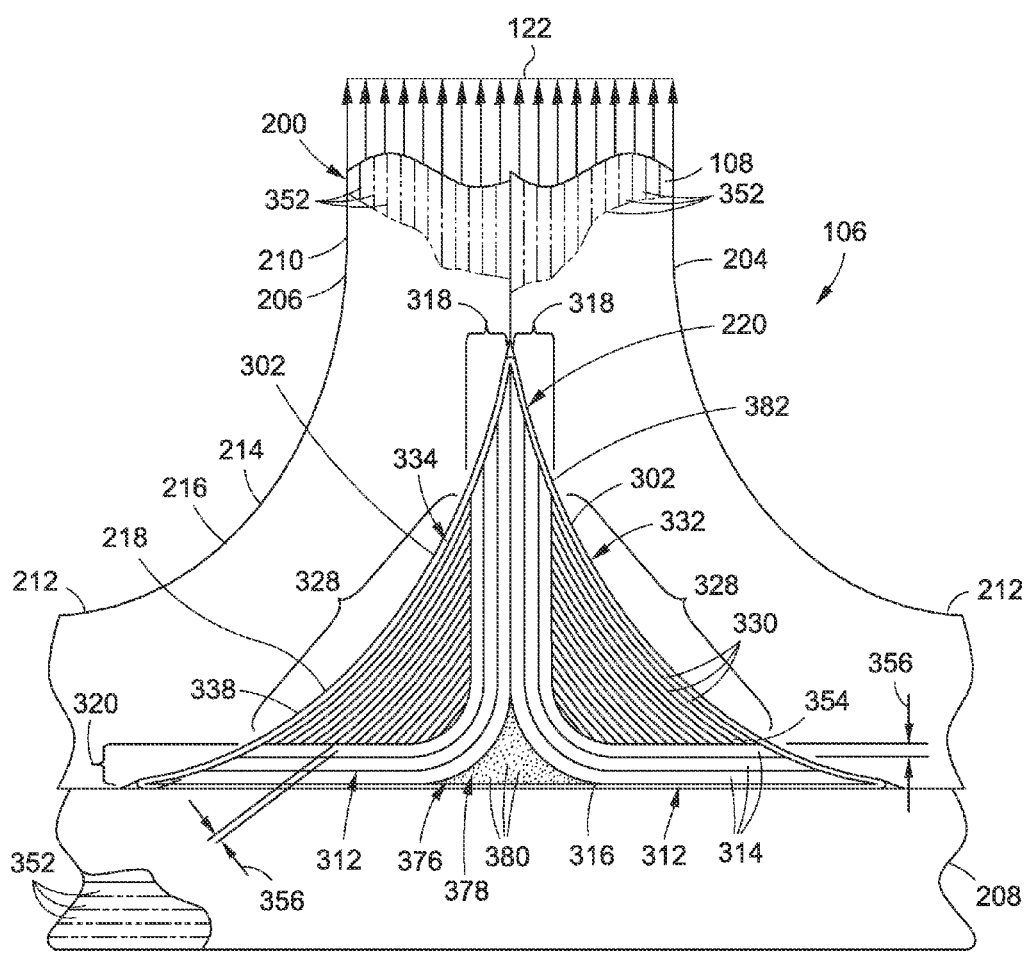
FIG. 4 is a side view of an example of a radius filler of the present disclosure taken along line 4 of FIG. 3 and illustrating the radius filler installed in a notch region of the I-beam stiffener and further illustrating a pull-off load applied to the I-beam stiffener.

FIG. 3 is a side view of an example of a composite I-beam stiffener 202 bonded to upper and lower skin panels 118. The I-beam stiffener 202 may include back-to-back C-channel 206 stiffener elements 204 which may be formed of laminated composite plies 352. Each one of the C-channel 206 stiffener elements 204 may include upper and lower stiffener flanges 212 interconnected by a stiffener web 210. Each one of the upper and lower stiffener flanges 212 of a stiffener element 204 may transition to the stiffener web 210 at a stiffener radius 214. Each stiffener radius 214 may have a stiffener radius outer surface 218 and a stiffener radius inner surface 216 (FIG. 4). The I-beam stiffener 202 may include a cap laminate 208 that may be formed of laminated composite plies 352. At each one of the upper and lower portions of the I-beam stiffener 202, the back-to-back stiffener radii 214 and the cap laminate 208 may enclose a generally triangular-shaped notch region 220 extending along a lengthwise direction 366 (FIG. 11) of the I-beam stiffener 202.

The present disclosure provides a composite radius filler 300 which may be installed in the notch region 220 (FIG. 3) defined by back-to-back stiffener radii 214 (FIG. 3) of a composite structure such as a composite stiffener 200 (FIG. 3). Advantageously, the radius filler 300 (FIG. 3) includes a combination of thick plies 314 (FIG. 3) and thin plies 330 (FIG. 3) in an arrangement that provides increased resistance to microcracking relative to the microcracking that occurs in conventional radius fillers 300 formed of bundles of unidirectional fiber tows 380 (FIG. 4) or other material configurations. In addition, the radius filler 300 of the present disclosure may provide increased pull-off strength in the attachment of the composite stiffener 200 (FIG. 3) to a composite skin panel 118 (FIG. 3), as described below. Furthermore, the radius filler 300 of the present disclosure may advantageously provide for the ability to tailor the mechanical properties (e.g., the stiffness or modulus) of the radius filler 300 to be complementary to the stiffness or modulus of the composite structure surrounding the radius filler 300 and complementary to the loading conditions and loading directions imposed on the composite assembly 106 (FIG. 3), as described in greater detail below. For example, the presently-disclosed radius filler 300 allows for configuring the ply orientation (e.g., skew angle), ply quantity, ply thickness, and fiber orientation 358 of the composite plies 352 that make up the radius filler 300 to tailor the strength, stiffness, and strain characteristics of the radius filler 300 along a lengthwise direction 366.

In the present disclosure, the composite plies 352 (FIG. 3) that make up the stiffener elements 204 (FIG. 3) and the radius filler 300 (FIG. 3) may include a plurality of reinforcing fibers (not shown) surrounded by a matrix material or resin (not shown). In some examples, the reinforcing fibers may be high-modulus or high-strength fibers formed of carbon, glass, or other metallic and/or non-metallic material. The reinforcing fibers in a composite ply 352 may be continuous fibers that may be commonly aligned or oriented in a single direction (e.g., unidirectional fibers). Alternatively, the reinforcing fibers in a composite ply 352 may be woven together in two or more directions in a fabric arrangement (not shown). In still further examples, the reinforcing fibers in a composite ply may be steered fibers that have varying directions along an in-plane direction of the composite ply. The composite plies 352 of the stiffener elements 204 and/or the radius filler 300 may be provided as pre-impregnated composite plies 352 wherein the reinforcing fibers may be pre-impregnated with a polymeric matrix material (e.g., prepreg) such as thermosetting resin (e.g., epoxy).

Referring still to FIG. 3, the notch region 220 may be enclosed by a cap laminate 208. In other examples not shown, the cap laminate 208 may be omitted and back-to-back stiffener elements 204 may be assembled directly to a skin panel 118 or other composite structure to enclose the notch region 220 containing the radius filler 300. The radius filler 300 may be installed in a notch region 220 of any one of a variety of different composite stiffener 200 configurations including, but not limited to, a blade stiffener (not shown), a hat section stiffener (not shown), a Z-section stiffener (not shown), and any one of a variety of other stiffener embodiments. In the present disclosure, a composite stiffener 200 may be provided in any size, shape, and configuration, without limitation. For example, a composite stiffener 200 may be provided as a stringer, a frame, a floor beam, or other stiffener configuration. Although the radius filler 300 of the present disclosure is described in the context of an I-beam stiffener 202 (e.g., a spar) for a horizontal stabilizer 116 of an aircraft 100, the radius filler 300 may be incorporated into one or more composite assemblies for any type of vehicular or non-vehicular application, without limitation.

FIG. 4 is a side view of an example of a radius filler 300 installed in a notch region 220 of a composite stiffener 200. As indicated above, the notch region 220 may be defined by back-to-back stiffener radii 214 of the stiffener elements 204. In the example shown, the notch region 220 may be enclosed by a cap laminate 208. Alternatively, the cap laminate 208 may be omitted and the notch region 220 may be enclosed by a skin panel 118 (FIG. 3) or other composite component. In the example shown, the cap laminate 208 and the stiffener elements 204 may be formed of laminated composite plies 352 such as prepreg composite plies 352. However, in other examples, the cap laminate 208 and/or the stiffener elements 204 may be formed of composite material in non-laminated form (not shown). The radius filler 300 may include opposing radius filler sides 302 which may be defined by the outer surfaces of the wedge-shaped crescent regions 328 and the free edges of the vertical legs 318 and free edges of the lateral legs 320 of the vertical ply stacks 312. The opposing radius filler sides 302 may be contoured complementary to the stiffener radius outer surfaces 218 of the back-to-back stiffener elements 204.

Figure 9:
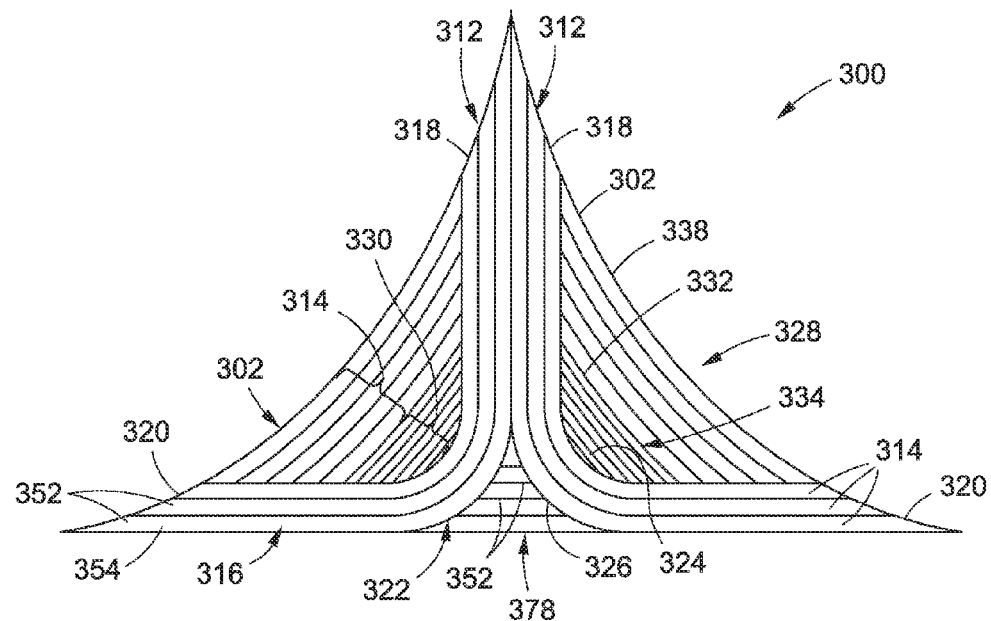
FIG. 9 is an example of a radius filler including back-to-back vertical ply stacks formed of thick plies with each crescent region including a radial thin ply stack located immediately adjacent to the stack radii and radial thick plies located outboard of the radial thin ply stack.

The presently-disclosed radius filler 300 (FIG. 4) may include a back-to-back pair of vertical ply stacks 312 (FIG. 4) each having a general L-shaped cross-section 316 (FIG. 4). Each one of the vertical ply stacks 312 may be formed of one or more thick plies 314 (FIG. 4) of composite material 108 (FIG. 4). Each L-shaped cross-section 316 may include a vertical leg 318 and a lateral leg 320 interconnected by a stack radius 322. The stack radius 322 (FIG. 9) may have a stack radius inner surface 324 (FIG. 9) and a stack radius outer surface 326 (FIG. 9). As shown, the size of the stack radius 322 (e.g., the stack radius inner surface 324) is smaller than the size of the stiffener radii 214 (e.g., the stiffener radius outer surface 218) of the stiffener elements 204. In one embodiment, the size of the stack radius inner surface 324 may be no more than 50 percent of the size of the stiffener radius outer surface 218 (FIG. 4). In some examples, the radius filler 300 may include a generally triangular-shaped inner noodle 378 (FIG. 4) filling an inner notch 376 bounded by the opposing stack radii 322 of the back-to-back vertical ply stacks 312 and enclosed by a cap laminate 208 or a skin panel 118 (FIG. 3), as described below. In still further examples, a fabric layer 382 may be wrapped around the radius filler 300. The fabric layer 382 (FIG. 4) may be a fiber-reinforced fabric such as fiberglass fabric. The fabric layer 382 may encase the radius filler 300 and allow for straining between the radius filler 300 and the surrounding composite stiffener elements 204. In this regard, the fabric layer 382 may act as a crack propagation barrier to reduce or prevent the propagation of microcracks from the radius filler 300 into the stiffener elements 204 (FIG. 4) and/or into the cap laminate 208 (FIG. 4).

Referring still to FIG. 4, the vertical leg 318 of each vertical ply stack 312 may be oriented generally parallel to the stiffener webs 210 of the back-to-back stiffener elements 204. The vertical legs 318 of the vertical ply stacks 312 may be positioned in abutting back-to-back contact with one another such that the lateral legs 320 of the vertical ply stacks 312 point in generally opposite directions. The lateral leg 320 of each vertical ply stack 312 may be oriented non-parallel to the vertical leg 318 of the vertical ply stack 312 such that the vertical ply stack 312 generally forms an L-shaped cross-section 316. In the example of FIG. 4, the lateral leg 320 of each vertical ply stack 312 may extend horizontally outwardly from the vertical leg 318 and may be oriented perpendicular to the vertical leg 318 and parallel to the stiffener flange 212 of the stiffener element 204. However, the lateral leg 320 of a vertical ply stack 312 may be oriented non-perpendicular to the vertical leg 318 and/or non-parallel to the stiffener flange 212.

The vertical leg 318, the lateral leg 320, and the stack radius 322 of each vertical ply stack 312 may define a crescent region 328 (FIG. 4) of the vertical ply stack 312. The crescent region 328 of at least one of the vertical ply stacks 312 (FIG. 4) may include one or more thin plies 330 of composite material 108 (FIG. 4) which may be positioned adjacent to the stack radius inner surface 324. The regions adjacent to the stack radii 322 (FIG. 6) may be locations of relatively high interlaminar tensile stress in the radius filler 300 (FIG. 3) as may be determined by structural modeling, as described below.

In the present disclosure, the ply thickness 356 (FIG. 4) of the individual thin plies 330 may be less than the ply thickness 356 of the individual thick plies 314 in the vertical ply stack 312 (FIG. 4). In one example, each one of the thin plies 330 may have a ply thickness 356 of no greater than 70 percent of the individual ply thickness 356 of the thick plies 314 (FIG. 4). In another example, the thin plies 330 may have a ply thickness 356 of approximately 50 percent of the ply thickness 356 of the thick plies 314. A radius filler 300 may also be provided in an embodiment having composite plies 352 (FIG. 4) with a ply thickness 356 in a range between the ply thickness 356 of the thin plies 330 and the ply thickness 356 of the thick plies 314. In a still further example not shown, one or both of the vertical ply stacks 312 of a radius filler 300 may include one or more thin plies 330 (FIG. 4) in addition to the thick plies 314 that may be included with the vertical ply stacks 312. In another example not shown, one or both of the vertical ply stacks 312 of a radius filler 300 may include composite plies 352 having a ply thickness 356 that is different than the ply thickness 356 of the thin plies 330 and different than the ply thickness 356 of the thick plies 314.

Referring to FIG. 4, in one example, at least one of the thin plies 330 may have a ply thickness 356 of approximately 50 percent of the ply thickness 356 of at least one of the thick plies 314. In an embodiment, the thin plies 330 (e.g., each thin ply 330) of the radius filler 300 may have a ply thickness 356 of less than 0.0030 inch. For example, the thin plies 330 may have a ply thickness 356 of approximately 0.0025±0.003 inch (e.g., 0.0027 inch). The thick plies 314 (e.g., each thick ply 314) may have a ply thickness 356 of at least 0.0050 inch. For example, each one of the thick plies 314 of the radius filler 300 may have a ply thickness 356 of approximately 0.0060±0.003 inch, (e.g., 0.0059 inch).

Figure 5:
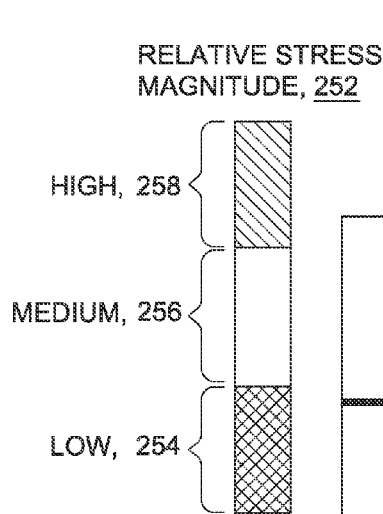
FIG. 5 is a chart of relative stress magnitude.
Figure 6:
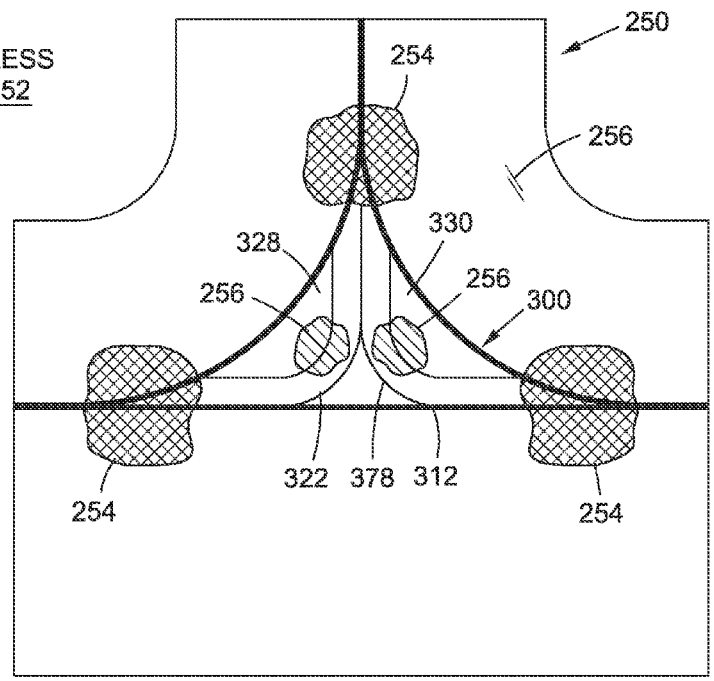
FIG. 6 is a schematic illustration of a portion of the I-beam stiffener of FIG. 4 at the location of the notch region and illustrating in cross-hatch localized regions of low interlaminar stress and localized regions of high interlaminar stress.
Figure 7:
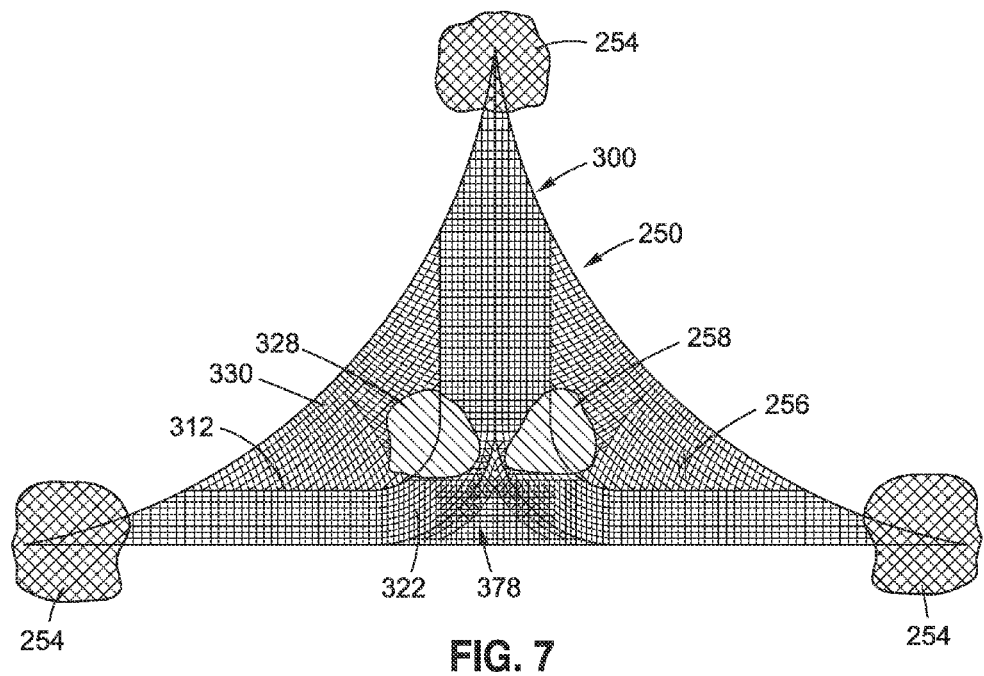
FIG. 7 is an illustration of a finite element model showing the interlaminar stress distribution in the radius filler.

Referring briefly to FIGS. 5-7, shown in FIG. 5 is a chart of relative stress magnitude 252 of interlaminar tensile stress corresponding to the stress distribution plots of the composite assembly 106 (FIG. 2) shown in FIGS. 6-7 and described below. In FIG. 5, the relative stress magnitudes 252 are divided into low interlaminar stress 254, medium interlaminar stress 256, and high interlaminar stress 258.

FIG. 6 illustrates the interlaminar stress distribution in a portion of an I-beam stiffener 202 including the radius filler 300 and surrounding structure including the stiffener elements 204 and the cap laminate 208. FIG. 7 illustrates a finite element model 250 (e.g., a computer model) of the radius filler 300. FIGS. 6-7 illustrate in cross-hatch several localized regions of low interlaminar stress 254 and several localized regions of high interlaminar stress 258. Interlaminar tensile stress in a composite laminate is oriented in a through-the-thickness direction or a direction normal to the composite plies 352, and may have a tendency to cause disbonding or delamination between the composite plies 352 (FIG. 4) of the composite laminate. Such interlaminar tensile stress may develop during manufacturing and/or thermal cycling of the composite assembly 106 (FIG. 4). For example, interlaminar tensile stress may develop during cool-down of the radius filler 300 from a curing temperature to ambient temperature (e.g., room temperature) due to the difference in the coefficient of thermal expansion (CTE) of the fibers relative to the CTE of the resin. Interlaminar tensile stress may also develop during thermal cycling which may occur due to changes in ambient temperature. In the example of an aircraft 100, thermal cycling of a composite assembly 106 may occur during changes in altitude as the aircraft 100 ascends and descends during the course of a flight.

In the stress distribution plots of FIGS. 6-7, the area surrounding and including each one of the three corners of the radius filler 300 may be regions of relatively low interlaminar stress 254. As shown in FIG. 7, within the radius filler 300, each one of the stack radii 322 and the surrounding area may be a region of relatively high interlaminar stress 258. The remainder of the radius filler 300 and surrounding stiffener elements 204 and cap laminate 208 may be regions of medium interlaminar stress 256 as shown in FIG. 6.

Referring back to FIG. 4, the presently-disclosed radius filler 300 advantageously includes thin plies 330 positioned within or adjacent to the regions of high interlaminar stress 258. In the example of FIGS. 6-7, such regions of high interlaminar stress 258 are located adjacent to and within the stack radius 322 of the vertical ply stacks 312. Positioning thin plies 330 at such regions of high interlaminar stress 258 may improve the transverse tensile capability of the radius filler 300 relative to the transverse tensile capability of a conventional radius filler 300 formed of unidirectional fiber tows 380 or thick plies 314. The improvement in transverse tensile capability of the presently-disclosed radius filler 300 may result in a reduction in microcracking in the radius filler 300 during manufacturing and/or thermal cycling.

In addition, the improvement in transverse tensile capability may also contribute to an improvement in the pull-off strength of the composite stiffener 200 (FIG. 4) relative to the pull-off strength of composite stiffeners 200 having conventional radius fillers 300 (FIG. 6). The pull-off strength of a composite stiffener 200 may be described as the ability of the composite stiffener 200 to resist separation or delamination from a composite skin panel 118 (FIG. 3) during the application of a pulloff load 122 (FIG. 4). A pulloff load 122 may be described as an out-of-plane load oriented parallel to the stiffener webs 210 and which may occur under certain loading conditions. For example, in an aircraft 100, a pulloff load 122 on a composite stiffener 200 of a wing panel may occur due to inertial loads of fuel in the wings 110 during a flight maneuver. In another example, the internal pressurization of a fuselage may result in pulloff loads 122 on a stiffened fuselage skin panel. A pulloff load 122 may have a tendency to urge the separation or delamination of the stiffener flanges 212 from a cap laminate 208 to which the stiffener flanges 212 (FIG. 4) may be co-cured or co-bonded. For configurations where the cap laminate 208 is omitted and the stiffener flanges are bonded directly to the skin panel 118 (FIG. 3), a pulloff load 122 may urge the separation or delamination of the stiffener flanges 212 from the skin panel 118.

Referring to FIG. 4, a majority of the improvement in pull-off capability provided by the presently-disclosed radius filler 300 (FIG. 3) may be a result of the orientation of the composite plies 352 in the vertical ply stacks 312 of the radius filler 300. In this regard, the vertical legs 318 of the vertical ply stacks 312 may improve the pull-off strength by providing an additional load path (e.g., in addition to the load path provided by the stiffener flanges 212) for transmitting the pulloff load 122 from the stiffener webs 210 into the lateral legs 320 and/or inner noodle 378 which, in turn, may transmit the pulloff load 122 into the cap laminate 208 or skin panel. A further advantage provided by the vertical ply stacks 312 is that the lateral legs 320 of the vertical ply stacks 312 may increase the capability for the composite stiffener 200 to carry bending loads. In addition, the lateral legs 320 of the vertical ply stacks 312 may increase the resistance of the composite stiffener 200 to shearing forces between the composite stiffener 200 and the cap laminate 208 or, if the cap laminate 208 is omitted, increasing the resistance to shearing between the composite stiffener 200 and a skin panel.

Figure 8:
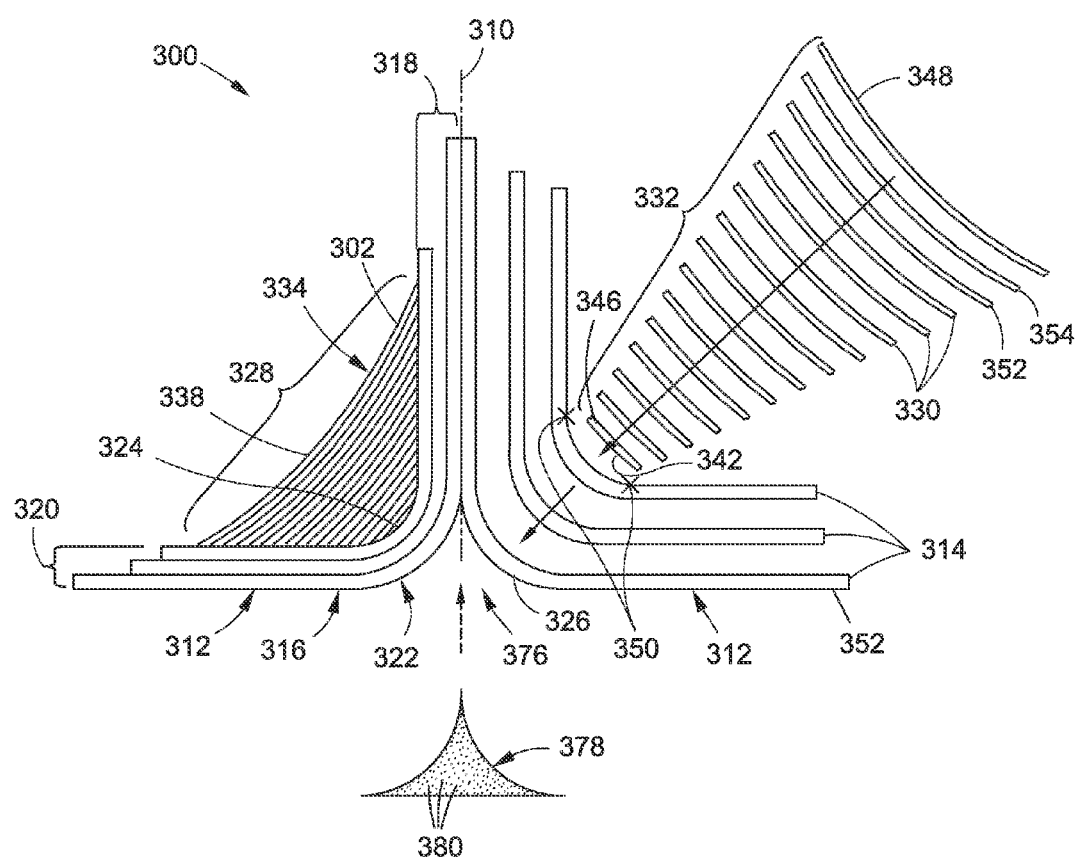
FIG. 8 is a partially exploded view of an example of a radius filler of the present disclosure including back-to-back vertical ply stacks each formed of thick plies and further including a thin ply stack located in a crescent region of each one of the vertical ply stacks.

FIG. 8 is a partially exploded view of an example of a radius filler 300 including back-to-back vertical ply stacks 312. As indicated above, each one of the vertical ply stacks 312 may be formed of one or more thick plies 314 as defined above. The thick plies 314 may be nested together and may form a generally L-shaped cross-section 316 having a vertical leg 318 and a lateral leg 320 interconnected by a stack radius 322. In the example shown in FIG. 8, each one of the vertical ply stacks 312 includes three thick plies 314 nested together to form an L-shaped cross-section 316. However, a vertical ply stack 312 may include any number of thick plies 314. Also shown in FIG. 8 are the thin plies 330 which may be positioned within the crescent region 328 defined by each one of the vertical ply stacks 312. As indicated above, the thin plies 330 may be positioned adjacent to the stack radius 322 which may be a location of relatively high interlaminar stress 258 (FIG. 7) in the radius filler 300.

Referring still to FIG. 8, the thin plies 330 may be arranged in a thin ply stack 332 comprising a laminate of two or more thin plies 330. As indicated above, each one of the thin plies 330 in the thin ply stack 332 may have an individual ply thickness 356 (FIG. 4) that is less than the individual ply thickness 356 of the thick plies 314 in the vertical ply stack 312. In the example shown, the thin ply stack 332 in each one of the wedge-shaped crescent regions 328 may be arranged in a radial thin ply stack 334 containing thin plies 330 having a curved shape 338. The thin ply 330 located nearest the stiffener radius 214 (FIG. 4) may have a radius of curvature that is complementary to the radius of curvature of the stiffener radius outer surface 218. Moving along a direction from the stiffener radius outer surface 218 (FIG. 4) toward the stack radius inner surface 324, the thin plies 330 in the radial thin ply stack 334 may have a progressively increasing radius of curvature and a progressively decreasing ply width 348 to fill the crescent region 328.

The thin plies 330 may have a ply width 348 (FIG. 8) that extends between the vertical leg 318 (FIG. 8) and the lateral leg 320 of the vertical ply stack 312. The radial thin ply stack 334 includes an innermost thin ply 346 (FIG. 8) located nearest the stack radius 322. The thin ply surface 342 (FIG. 8) of the innermost thin ply 346 may face the stack radius inner surface 324 (FIG. 8). In some examples, the ply width 348 of the innermost thin ply 346 may be aligned with the stack radius 322 of the vertical ply stack 312 (FIG. 8). More specifically, the ply width 348 of the innermost thin ply 346 may be positioned such that the opposing thin ply longitudinal edges 344 (FIG. 10) of the innermost thin ply 346 are located between the tangents 350 of the stack radius 322 with the lateral leg 320 and the vertical leg 318.

The composite material 108 (FIG. 4) from which the thin plies 330 (FIG. 8) and thick plies 314 (FIG. 8) may be formed may be comprised of pre-preg unidirectional slit tape comprised of fiber-reinforced polymer matrix material. Such unidirectional slit tape may be provided in standard ply widths 348 (FIG. 8). For example, the thick plies 314 and/or the thin plies 330 may be formed of unidirectional slit tape in ply widths 348 of 0.125 inch, 0.25 inch, 0.375 inch, and/or 0.50 inch which may be standard ply widths. However, one or more of the thick plies 314 and thin plies 330 may be formed of unidirectional slit tape having ply widths 348 greater than the 0.5 inch (e.g., 0.75 inch or 1.0 inch). In addition, one or more of the thick plies 314 and/or thin plies 330 (FIG. 8) made be formed of non-standard ply widths 348. In some examples, the thick plies 314 and the thin plies 330 may be formed of the same composite material 108. For example, the thick plies 314 and the thin plies 330 may be formed of unidirectional slit tape having the same resin composition and/or the same fiber material. However, the thick plies 314 may be provided in a different material composition than the thin plies 330. In some examples, the thin plies 330 and/or the thick plies 314 may have a coefficient of thermal expansion (CTE) that is compatible with the CTE of the composite material 108 from which the stiffener elements 204 (FIG. 6) and/or cap laminate 208 (FIG. 6) is formed. For example, the CTE of the radius filler 300 composite plies 352 may be within 10 percent of the CTE of the composite plies 352 (FIG. 8) of the stiffener elements 204 and/or cap laminate 208.

Referring still to FIG. 8, the radius filler 300 may include an inner noodle 378 (FIG. 8) as indicated above which may be installed within the inner notch 376 (FIG. 8) defined between the back-to-back vertical ply stacks 312 (FIG. 8) which may be a region of relatively low interlaminar stress 254 (see FIG. 7). In addition, the inner noodle 378 (FIG. 8) may have a relatively small size such that the inner noodle 378 may be formed of unidirectional fiber tows 380 (FIG. 8), laminated composite plies 352, or other material configurations. In one example, the inner noodle 378 may be formed of laminated off-axis composite plies 352, one or more of which may have a fiber orientation 358 that is non-parallel to the lengthwise direction 366 (FIG. 11) of the radius filler 300.

FIG. 9 shows another example of a radius filler 300 including back-to-back vertical ply stacks 312 formed of thick plies 314 and including a radial thin ply stack 334 in each crescent region 328 of each vertical ply stack 312. The radial thin ply stack 334 may be located immediately adjacent to the stack radii 322 at the location of relatively high interlaminar stress 258 (FIG. 7). The radius filler 300 may further include radial thick plies 314 located outboard of the radial thin ply stack 334. The outermost ply of the radial thick plies 314 may have a radius of curvature that is complementary to the radius of curvature of the stiffener radius outer surface 218 (FIG. 4). The inner noodle 378 of the radius filler 300 in FIG. 9 may be comprised of a stack of laminated thick plies 314.

Figure 10:
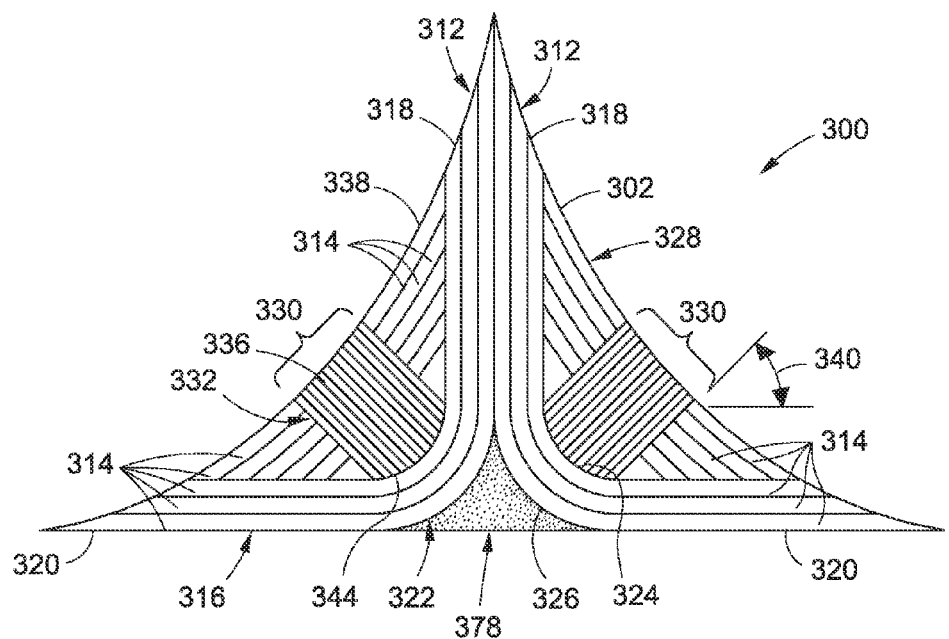
FIG. 10 is a further example of a radius filler including back-to-back vertical ply stacks formed of thick plies with each crescent region including a thin ply stack oriented at a skew angle relative to a lateral leg of the vertical ply stack.

FIG. 10 is a further example of a radius filler 300 including back-to-back vertical ply stacks 312 formed of thick plies 314. Each crescent region 328 includes a thin ply stack 332 containing thin plies 330 having a planar shape 336 and oriented at a skew angle 340 that is non-parallel to the vertical leg 318 and non-parallel to the lateral leg 320 of the vertical ply stack 312. The thin plies 330 may be oriented at any skew angle 340 between 0-90 degrees relative to the lateral leg 320. The skew angle 340 of the thin ply stack 332 may provide a means for tailoring the bending stiffness of the radius filler 300 to be complementary to the bending stiffness of the composite stiffener 200 (FIG. 4) or the composite structure (not shown) surrounding the composite stiffener 200. For example, orienting each thin ply stack 332 at a skew angle 340 approaching 90 degrees to the lateral leg 320 may increase the vertical bending stiffness of the radius filler 300 and thereby contribute to the vertical bending stiffness of the composite stiffener 200. Conversely, orienting each thin ply stack 332 at a skew angle 340 approaching 0 degrees relative to the lateral leg 320 may reduce the vertical bending stiffness of the radius filler 300.

Referring still to FIG. 10, the thin plies 330 in each thin ply stack 332 are oriented such that the thin ply longitudinal edges 344 are positioned in close proximity to the stack radius inner surface 324 of the stack radius 322. In some examples, the thin ply longitudinal edges 344 of the thin ply stack 332 may be disposed in abutting contact with the stack radius inner surfaces 324. On a side of each thin ply stack 332 opposite the stack radii 322, the thin ply longitudinal edges 344 may be contoured complementary to the stiffener radius outer surface 218 (FIG. 4). The regions above and below each thin ply stack 332 may be filled with radial thin ply stacks 334 and/or radial thick ply 314 stacks (not shown). In a further embodiment not shown, the regions above and below each thin ply stack 332 may be filled with thin plies 330 and/or thick plies 314 having a planar shape 336 and which may be oriented at any skew angle 340 including parallel to the lateral leg 320 and parallel to the vertical leg 318. As may be appreciated, the crescent region 328 of each vertical ply stack 312 may include any one of a variety of configurations of thin plies 330 and/or thick plies 314 to achieve the desired mechanical properties. Advantageously, in any of one of the radius filler 300 embodiments disclosed herein, the ability to arrange the thick plies 314 and the thin plies 330 in multiples directions provides for multiple planes that may be reduce or prevent the propagation of microcracks in the radius filler 300.

FIG. 11 is a perspective view of an example of a radius filler 300 including a radial thin ply stack 334 in each crescent region 328. One or both of the radial thin ply stacks 334 may contain one or more 0-degree plies 360. A 0-degree ply 360 may have a fiber orientation 358 that is parallel to the lengthwise direction 366 the radius filler 300. A thin ply stack 332 may additionally include one or more unidirectional off-axis thin plies 330 having fiber orientations 358 that are non-parallel to the lengthwise direction 366. The thin plies 330 with non-parallel fiber orientations 358 may include fiber orientations 358 of any plus or minus angle of up to 90 degrees relative to the lengthwise direction 366. The fiber orientations 358 of the thin ply stacks 332 may be arranged to provide the desired stiffness characteristics and/or strain characteristics in the radius filler 300. In an embodiment, at least one of the thin ply stacks 332 may have a stacking sequence of alternating plus and minus off-axis plies. For example, one of the thin ply stacks 332 may have a −20-degree ply and a +20-degree ply sandwiched between 0-degree plies 360 on opposite sides of the −20-degree ply and +20-degree ply. Even further, one or both of the vertical ply stacks 312 of the same radius filler 300 may include one or more thick plies 314 having any combination of 0-degree fiber orientations and off-axis fiber orientations to provide the radius filler 300 with the desired stiffness and strain characteristics.

Figure 13:
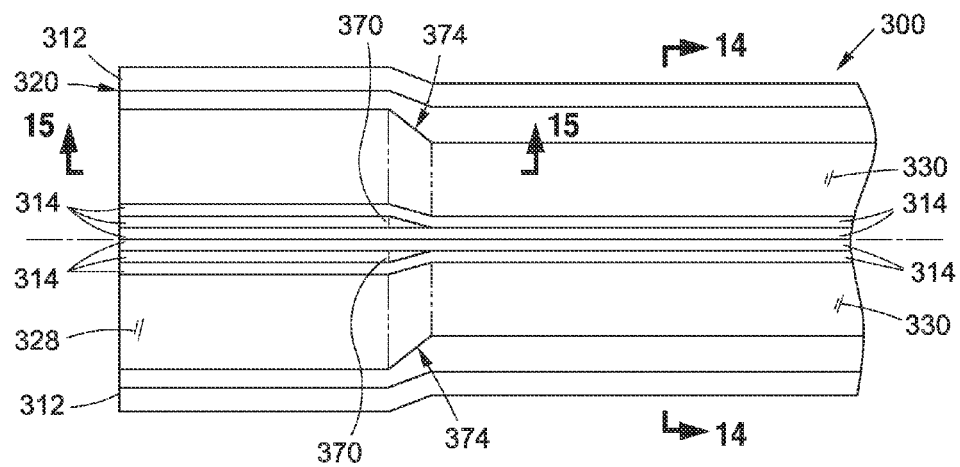
FIG. 13 is a top view of the radius filler taken along line 13 of FIG. 12 showing the different radius filler widths of the radius filler at different locations along the lengthwise direction.
Figure 12:
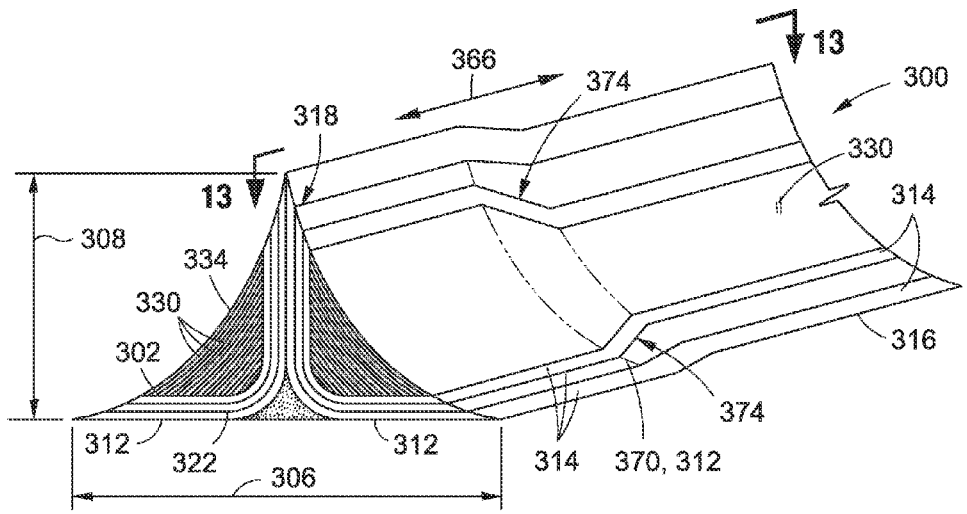
FIG. 12 is a perspective view of an example of a radius filler having a variable cross-sectional shape as a result of a ply drops in the thick plies and/or ply drops in the thin plies.

FIG. 12 shows an example of a radius filler 300 having a variable cross-sectional shape 368. The variable cross-sectional shape 368 may be formed by one or more ply drops 370 or ply additions 372 at one or more locations along the lengthwise direction 366 of the radius filler 300. One or more ply drops 370 or ply additions 372 may be incorporated into the vertical ply stacks 312, and/or or more ply drops 370 or ply additions 372 may be incorporated into the thin plies 330 (and optional thick plies 314) of the crescent region 328 (FIG. 13). For example, FIG. 12 shows a ply drop 370 incorporated into each one of the vertical ply stacks 312. More particularly, the center thick ply 314 of each one of the 3-ply vertical ply stacks 312 is terminated within a transition zone 374 of the radius filler 300.

Figure 14:
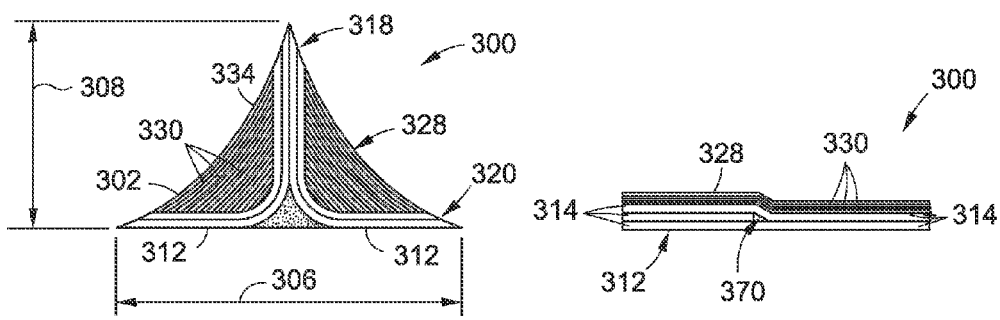
FIG. 14 is a transverse cross-sectional view of the radius filler taken along line 14 of FIG. 13 and illustrating the reduced quantity of thick plies in vertical ply stack resulting in a reduction in the radius filler width and a reduction in the radius filler height.

FIG. 13 is a top view of the radius filler 300 showing the change in the radius filler width 306 (FIG. 14) at the transition zone 374. The transition zone 374 may also be the location of a reduction in the radius filler height 308 (FIG. 14). In the transition zone 374, the width of the lateral legs 320 and/or the height of the vertical legs 318 (FIG. 12) may be reduced at the location of a ply drop 370. Alternatively or additionally, one or more of the thin plies 330 in the radial thin ply stacks 334 of each crescent region 328 may also include one or more ply drops 370 to further reduce the cross-sectional shape of the radius filler 300. A ply addition 372 may generally be described as being similar to a ply drop 370 with the difference that the ply addition 372 occurs along an opposite lengthwise direction 366 of the radius filler 300. In some examples, a ply drop 370 and/or a ply addition 372 in a radius filler 300 may be located in correspondence with the location of a respective ply addition (not shown) or ply drop (not shown) in the back-to-back stiffener elements 204 as a means to avoid variations in the outer contour of the stiffener radius inner surface 216 (FIG. 3) which may simplify acoustic inspection of the cured composite stiffener 200.

FIG. 14 is a transverse cross-section of the radius filler 300 showing the reduced quantity of thick plies 314 (FIG. 12) in the vertical ply stacks 312 due to the ply drop 370 (FIG. 13) in each one of the vertical ply stacks 312. In FIG. 14, the radius filler 300 has a reduced radius filler width 306 and a reduced radius filler height 308 relative to the radius filler width 306 and radius filler height 308 at the end of the radius filler 300 as shown in FIG. 12. The opposing radius filler sides 302 may be contoured complementary to stiffener radius 214 outside surfaces (not shown) of the back-to-back stiffener elements 204 (not shown).

Figure 15:
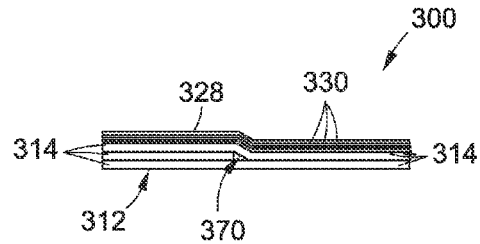
FIG. 15 is a sectional side view of the radius filler taken along line 15 of FIG. 13 and illustrating a ply drop in the vertical ply stack.

FIG. 15 is a sectional side view of the radius filler 300 showing the ply drop 370 of the center ply in one of vertical ply stacks 312. The top ply of the vertical ply stack 312 may extend continuously along the lengthwise direction 366 (FIG. 12) the radius filler 300 to cover the stair-step shape of the ply drop 370 and improve manufacturability. The plies of the vertical ply stack 312 and the thin plies 330 in the crescent region 328 may conform to the stair-step shape of each ply drop 370 and ply addition 372 (FIG. 12). The ply drops 370 and ply additions 372 provide a means for varying the quantity of composite plies 352 (FIG. 9) at any given location along the lengthwise direction 366 of the radius filler 300 as a means to vary the stiffness and strain characteristics of the radius filler 300 and to conform to localized changes in the thickness of the stiffener elements 204 (FIG. 6). Advantageously in the present disclosure, the ability to control the fiber orientation 358 (FIG. 11), composite ply quantity (e.g., via ply drops 370 and ply additions 372), skew angle 340 (FIG. 10), and ply thickness 356 (e.g., thick plies 314 versus thin plies 330) (FIG. 4) along the lengthwise direction 366 (FIG. 12) of the radius filler 300 provide multiple means for controlling the stiffness and strain characteristics of the radius filler 300 at any location along the lengthwise direction 366 of the composite stiffener 200.

It should be noted that the radius filler 300 is not limited to an arrangement where the radius filler 300 is symmetrical about a vertical centerline 310 (FIG. 8) of a transverse cross-section of the radius filler 300 (FIG. 15). In a symmetrical radius filler 300, the vertical ply stacks 312 (FIG. 15) and the crescent regions 328 (FIG. 15) may be configured substantially similar to one another. However, in other examples not shown, a radius filler 300 may be non-symmetrical about a vertical centerline 310. In still other examples, a radius filler 300 may be symmetrical at some locations and non-symmetrical at other locations along the lengthwise direction 366 (FIG. 12) of the radius filler 300 such as in a composite stiffener 200 (FIG. 4) that has a stiffener web 210 (FIG. 4) with a changing angle along the lengthwise direction 366 of the composite stiffener 200. For non-symmetrical arrangements, a radius filler 300 may include a pair of back-to-back vertical ply stacks 312 that may be configured differently from one another. For example, the vertical ply stacks 312 of a radius filler 300 may include a similar quantity of thick plies 314 (FIG. 4) although the lateral leg 320 (FIG. 4) and/or the vertical leg 318 (FIG. 4) of one of the vertical ply stacks 312 may be of a different length than the lateral leg 320 and/or the vertical leg 318 of the other vertical ply stack 312 in the same radius filler 300. Likewise, the crescent region 328 in one of the vertical ply stacks 312 may include a different arrangement of thin plies 330 (and optionally thick plies 314) (FIG. 15) than the crescent region 328 in the other vertical ply stack 312 of the same radius filler 300.

Figure 16:
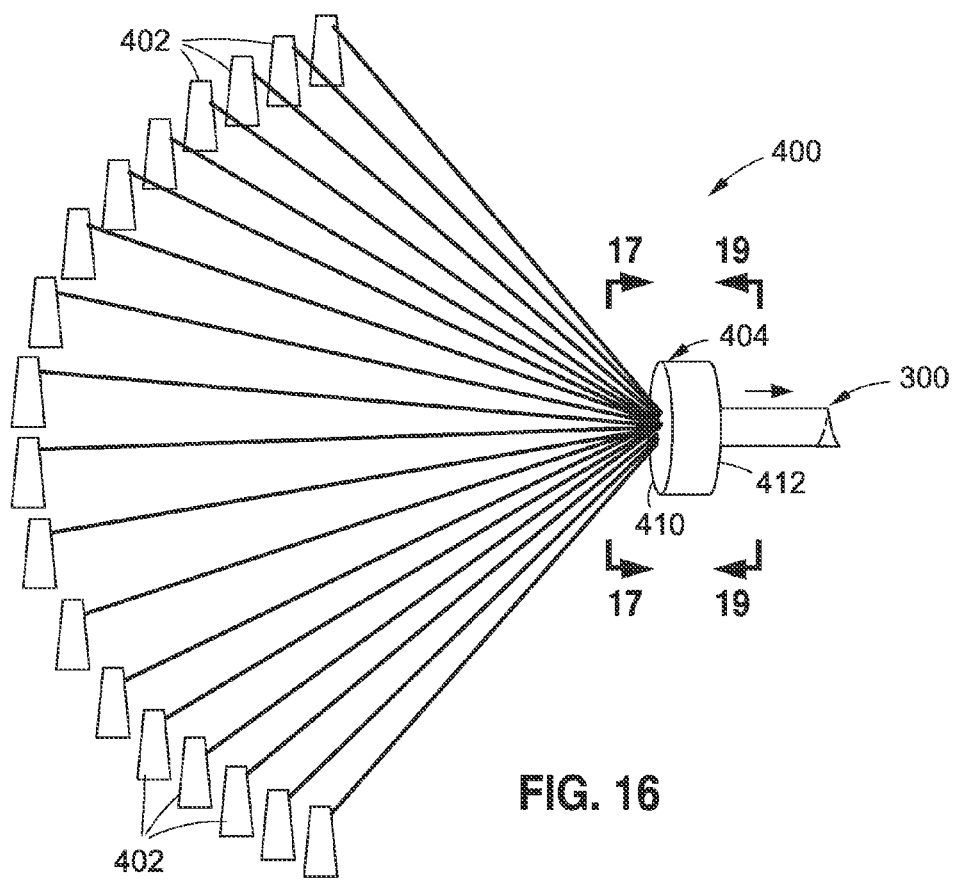
FIG. 16 is a perspective illustration of an example of a pultrusion system as may be implemented for forming a radius filler.

FIG. 16 is a perspective illustration of an example of a pultrusion system 400 as may be implemented for forming a radius filler 300. In an embodiment, the pultrusion system 400 may include a plurality of tape spools 402 containing continuous lengths of composite tape 354. In one example, the composite tape 354 (FIG. 9) may be prepreg unidirectional slit tape of a predetermined ply width 348 (FIG. 8), ply thickness 356 (e.g., to form thick plies 314 and/or thin plies 330), and having a predetermined fiber orientation 358 (FIG. 11) according to a predetermined stacking sequence for the vertical ply stacks 312 and the crescent regions 328 of the radius filler 300. The composite tape 354 may be fed into an entrance side 410 of a forming die 404 which may converge the plurality of composite tapes 354 into contacting relation with one another to produce a continuous length of radius filler 300 that may be drawn from an exit side 412 of the forming die 404.

Figure 17:
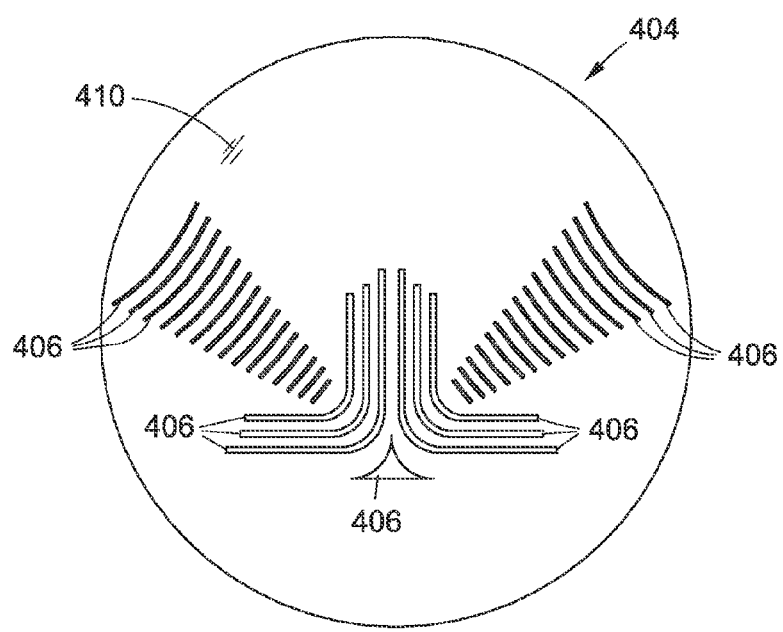
FIG. 17 is an end view of an entrance side of a forming die having a plurality of openings for receiving composite tape for forming the radius filler.

FIG. 17 is an end view of an example of an entrance side 410 of a forming die 404. The entrance side 410 may include a plurality of openings 406 for receiving the composite tape 354 from the tape spools 402 (FIG. 16). As indicated above, the ply width 348 (e.g., tape width), the ply thickness 356 (e.g., thick plies 314 or thin plies 330) (FIG. 4), and fiber orientation 358 of the composite tape 354 (FIG. 9) for each opening 406 may be selected based upon the relative position of the composite tape 354 within the radius filler 300.

Figure 18:
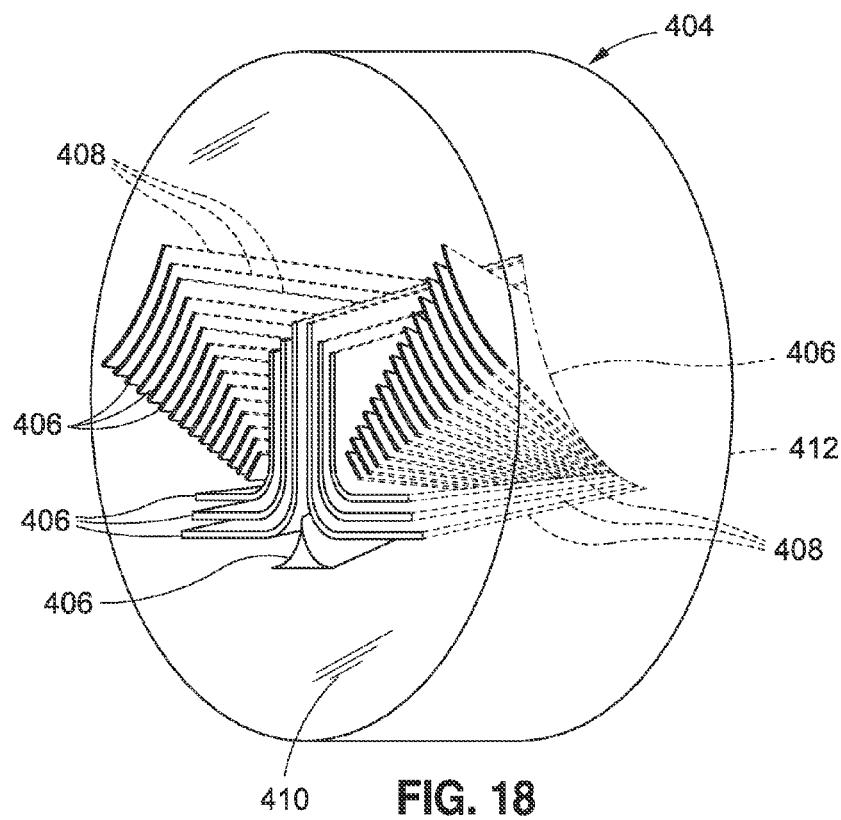
FIG. 18 is a perspective side view of the entrance side of the forming die of FIG. 17 and illustrating channels converging along a direction from the entrance side toward an exit side of the forming die.

FIG. 18 is a perspective side view of the entrance side 410 of the forming die 404 showing a plurality of channels 408 corresponding to the plurality of openings 406. The channels 408 of the forming die 404 may converge and combine the plurality of composite plies 352 as the composite plies 352 (FIG. 9) pass through the forming die 404 along a direction from the entrance side 410 toward the exit side 412.

Figure 19:
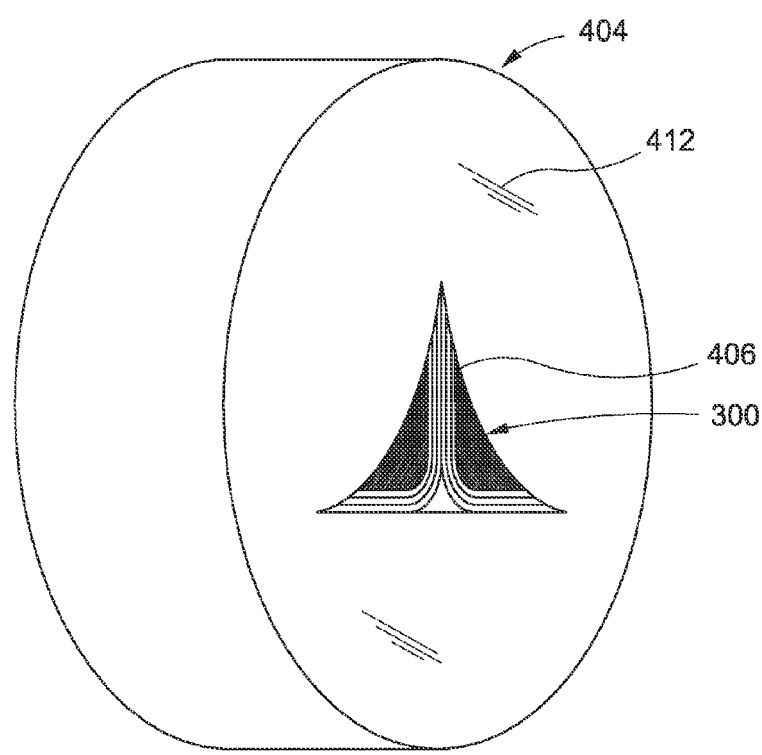
FIG. 19 is a perspective side view of the exit side of the forming die taken along line 19 of FIG. 16 and illustrating an opening from which the radius filler may be drawn.

FIG. 19 is a perspective side view of an example of the exit side 412 of the forming die 404 taken along line 19 of FIG. 16 and illustrating a cross-section of a radius filler 300 which may be drawn from the exit side 412. In some examples, the opening 406 in the exit side 412 may be sized and configured complementary to the general shape of the notch region 220 prior to installation of the radius filler 300 into the notch region 220 (FIG. 3) prior to co-curing.

It should be noted that the radius filler 300 as disclosed herein may be manufactured by any one of a variety of manual or automated means, and is not limited to the pultrusion system 400 illustrated in FIGS. 16-19. For example, a radius filler 300 may be formed by manually laying up individual composite plies 352 (FIG. 9) using one or more layup tools such as a vertical ply stack layup tool (not shown) for laying up thick plies 314 (FIG. 15) in a nested arrangement to form the vertical ply stacks 312 (FIG. 15). One or more crescent region layup tools (not shown) may be implemented for laying up a plurality of thin plies 330 (FIG. 15) to form the crescent regions 328 of each one of the vertical ply stacks 312.

Figure 20:
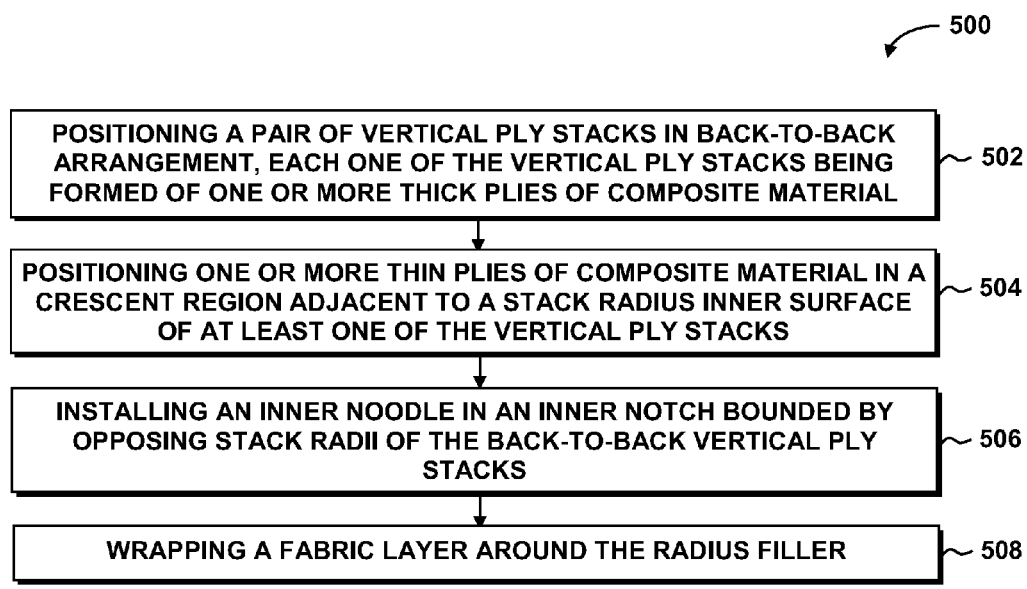
FIG. 20 is an illustration of a flowchart having one or more operations that may be included in a method of manufacturing a radius filler.

FIG. 20 is an illustration of a flowchart having one or more operations that may be included in a method 500 of manufacturing a radius filler 300 (FIG. 3). The method may include forming a pair of vertical ply stacks 312 (FIG. 4). As indicated above, each vertical ply stack 312 may be formed into an L-shaped cross-section 316 (FIG. 4) using one or more thick plies 314 (FIG. 4). In some examples, a vertical ply stack 312 may be formed by nesting together two or more thick plies 314. However, as indicated above, a vertical ply stack 312 may include thin plies 330 (FIG. 4) having a ply thickness 356 (FIG. 4) that is less than the ply thickness 356 of the thick plies 314. For example, the individual thin plies 330 may have a ply thickness 356 of no greater than 70 percent of the individual ply thickness 356 of the thick plies 314. In a specific example, the thin plies 330 may have a ply thickness 356 of approximately 50 percent of the ply thickness 356 of the thick plies 314.

As indicated above, the thick plies 314 (FIG. 4) and the thin plies 330 (FIG. 4) may be formed of unidirectional slit tape which may be provided in standard ply thicknesses 356 (FIG. 4) and/or ply widths 348 (FIG. 8). For example, the thin plies 330 and the thick plies 314 may be formed of prepreg unidirectional slit tape in ply widths 348 of 0.125 inch, 0.25 inch, 0.375 inch, or 0.50 inch. For the thin plies 330, the unidirectional slit tape may be provided in a ply thickness 356 of less than 0.0030 inch (e.g., 0.0027 inch).

The thick plies 314 of the same radius filler 300 may have a ply thickness 356 of at least 0.0050 inch (e.g., 0.0059 inch). However, the thin plies 330 and the thick plies 314 may be provided in other ply thicknesses.

Step 502 positioning of the method 500 may include positioning a pair of vertical ply stacks 312 in back-to-back arrangement with one another as shown in FIG. 4. In this regard, the vertical legs 318 (FIG. 4) of the vertical ply stacks 312 may be positioned in contacting relation with one another such that the lateral legs 320 (FIG. 4) of the vertical ply stacks 312 point in opposite directions. The back-to-back stack radii 322 of the vertical ply stacks 312 form an inner notch 376 into which an inner noodle 378 (FIG. 4) may be installed. The vertical leg 318 and lateral leg 320 (FIG. 4) of each one of the vertical ply stacks 312 defines a crescent region 328.

Step 504 of the method 500 may include positioning one or more thin plies 330 of composite material 108 (FIG. 4) in the crescent region 328 (FIG. 4). As indicated above, thin plies 330 (FIG. 4) may advantageously be positioned adjacent to the stack radius inner surface 324 of at least one of the vertical ply stacks 312 (FIG. 4). In one example, the step of positioning thin plies 330 within the crescent region 328 may include orienting one or more thin plies 330 such that the thin ply longitudinal edges 344 (FIG. 10) of at least one of thin plies 330 is in contact with the stack radius inner surface 324 (FIG. 10) of at least one of the vertical ply stacks 312 as shown in FIG. 10. The step of orienting one or more thin plies 330 within the crescent region 328 may include canting the thin plies 330 of the thin ply stack 332 (FIG. 10) at a skew angle 340 that is non-parallel to the vertical leg 318 and the lateral leg 320 (FIG. 10). The thin plies 330 may be oriented at a skew angle 340 of between 0-90 degrees relative to the lateral leg 320 (FIG. 10) of a vertical ply stack 312. For example, the thin plies 330 may be oriented at a skew angle 340 of between 20-70 degrees relative to the lateral leg 320. The thin plies 330 in the crescent region 328 (FIG. 10) may have a planar shape 336 (FIG. 10). Alternatively, the thin plies 330 in the crescent region 328 may have a curved shape 338 (FIG. 10) as described below.

In an embodiment, the step of positioning the thin plies 330 in the crescent region 328 may include orienting the thin plies 330 (FIG. 9) of at least one of the vertical ply stacks 312 such that a thin ply surface 342 of an innermost thin ply 346 (FIG. 8) faces the stack radius inner surface 324 of the vertical ply stack 312 (FIG. 9). In some examples, the method may include arranging a plurality of thin plies 330 (e.g., at least two) in a radial thin ply stack 334 as shown in FIGS. 4 and 9. The thin plies 330 in the radial thin ply stack 334 (FIG. 9) may have a curved shape 338 which may fill the crescent region 328 (FIG. 9). The curved shape 338 (FIG. 9) of the radial thin ply stack 334 may be configured complementary to the stiffener radius outer surface 218 of the stiffener radius 214 joining the stiffener flange 212 to the stiffener web 210, as shown in FIG. 4.

The method may additionally include aligning the ply width 348 (FIG. 8) of an innermost thin ply 346 (FIG. 8) of a radial thin ply stack 334 (FIG. 9) with the stack radius 322 (FIG. 9) of at least one of the vertical ply stacks 312 (FIG. 12). As shown in FIG. 8, the ply width 348 of the innermost thin ply 346 may be generally centered with the stack radius 322 such that the opposing thin ply longitudinal edges 344 (FIG. 10) of the innermost thin ply 346 are located between the tangents 350 (FIG. 8) of the stack radius 322 to the respective lateral leg 320 (FIG. 8) and vertical leg 318 (FIG. 8). The method may additionally include forming the radius filler 300 with opposing radius filler sides 302 (FIG. 8) that may be contoured complementary to the stiffener radius outside surfaces 218 of the back-to-back stiffener elements 204 (FIG. 4).

Referring briefly to FIG. 11, the method may include arranging the thick plies 314 and/or thin plies 330 such that the fiber orientation 358 of at least one of the composite plies 352 is non-parallel to the lengthwise direction 366 of the radius filler 300. For example, FIG. 11 illustrates off-axis plies in the radial thin ply stack 334 and including a plus off-axis ply 364 and a minus off-axis ply 362 sandwiched between 0-degree plies 360 on opposite sides of the plus off-axis ply 364 and minus off-axis ply 362. Although not shown, one or more of the thick plies 314 in the vertical ply stack 312 may also include off-axis plies and/or 0-degree plies 360. In one example, the method of manufacturing the radius filler 300 may include stacking two or more thin plies 330 to form a thin ply stack 332 (FIG. 10), and nesting together two or more thick plies 314 to form a vertical ply stack 312 in a L-shaped cross-section 316.

The method may additionally include forming the vertical ply stack 312 (FIG. 11) and/or the thin ply stack 332 (FIG. 10) by sandwiching a −20-degree ply and a +20-degree ply between 0-degree plies 360 on opposite sides of the ±20-degree plies 360 (FIG. 11). As indicated above, the composite plies 352 of the radius filler 300 (FIG. 11) may be laid with any one of a variety of different stacking sequence of fiber orientations 358 (FIG. 11) to achieve the desired strength, stiffness, and strain characteristics of the radius filler 300. In some examples, the fiber orientation (e.g., the stacking sequence) of the composite plies 352 that make up the radius filler 300 (FIG. 11) may be selected to provide the radius filler 300 with a stiffness that is complementary to the stiffness of the composite assembly 106 (FIG. 1) containing the composite stiffener 200 (FIG. 4).

Referring to FIGS. 12-15, the method may further include varying the cross-sectional shape of the radius filler 300 along a lengthwise direction 366 (FIG. 12). As indicated above, the cross-sectional shape of the radius filler 300 may be varied by adding or dropping at least one thick ply 314 (FIG. 13) along the length of at least one of the vertical ply stacks 312. Alternatively or additionally, the cross-sectional shape of the radius filler 300 may be varied by adding or dropping at least one thin ply 330 (FIG. 14) in the crescent region 328 of at least one of the vertical ply stacks 312 (FIG. 15). As indicated above, composite plies 352 (FIG. 9) may be added or dropped in correspondence with a ply drop (not shown) or ply addition (not shown) in the stiffener elements 204 (FIG. 4) that make up the composite stiffener 200.

Referring briefly to FIG. 16-19, in one example, any one or more radius filler 300 configurations may be manufactured using a pultrusion system 400. For example, the method may include drawing a plurality of unidirectional slit tapes into a plurality of openings 406 in an entrance side 410 (FIG. 16) of the forming die 404. As indicated above, the forming die 404 may include channels 408 that extend from the openings 406 (FIG. 17) on the entrance side 410 to an opening on the exit side 412 (FIG. 18) of the forming die 404. The method may include pultruding a plurality of thick plies 314 (FIG. 13) and a plurality of thin plies 330 (FIG. 13) into the appropriate openings 406 on the entrance side 410. As indicated above, the openings 406 on the entrance side 410 of the forming die 404 may converge and combine or press together the plurality of unidirectional slit tapes to form the back-to-back vertical ply stacks 312 (FIG. 13) and crescent regions 328 (FIG. 13) as the radius filler 300 is drawn out of the exit side 412 of the forming die 404.

Step 506 of the method 500 may include installing a generally triangularly-shaped inner noodle 378 in an inner notch 376 defined between or bounded by the stack radii 322 of the back-to-back vertical ply stacks 312 (FIG. 10). The installation of the inner notch 376 (FIG. 8) may occur simultaneous with the forming of the radius filler 300 in the forming die 404. For example, the installation of the inner noodle 378 (FIG. 10) may occur by drawing bundles of unidirectional fiber tows 380 into an opening formed in the entrance side 410 of the forming die 404 as shown in FIG. 17. A channel in the forming die 404 (FIG. 18) may converge the unidirectional fiber tows 380 with the composite plies 352 (FIG. 10) of the vertical ply stack 312 and crescent regions 328 as the radius filler 300 is drawn from the exit side 412 of the forming die 404. However, in another example, the inner noodle 378 may be formed from a stack of composite plies 352. The method may further include applying a cap laminate 208 to the stiffener flanges 212 (FIG. 4) of the back-to-back stiffener elements 204 (FIG. 6) to encapsulate the inner noodle 378 within the inner notch 376.

In some examples, the composite plies 352 (e.g., the unidirectional slit tape) (FIG. 10) that make up the radius filler 300 may be pre-heated prior to entering the openings 406 (FIG. 18) of the forming die 404. Alternatively or additionally, the forming die 404 (FIG. 18) may be heated such that heat is conducted into the composite plies 352 during passage through the forming die 404 to facilitate at least partially bonding or tacking the composite plies 352 together. A drive mechanism (not shown) may be implemented for pulling, pushing, or urging the composite plies 352 or unidirectional slit tape through the forming die 404 in a continuous or semi-continuous manner. As indicated above, manufacturing of the radius filler 300 is not limited to pultruding through a forming die 404. For example, a radius filler 300 may be manufactured by manual or automated layup of composite plies 352 (e.g., thick plies 314) to form the vertical ply stacks 312 (FIG. 10). The composite plies 352 that fill the crescent region 328 (FIG. 13) of each vertical ply stack 312 may be individually laid up and installed within the crescent region 328, or the composite plies 352 of the may be simultaneously laid up during the layup of the vertical ply stacks 312.

Step 508 of the method 500 may include wrapping a fabric layer 382 around the radius filler 300 (FIG. 4). In one example, the fabric layer 382 (FIG. 4) may be fiberglass fabric layer that may be applied after drawing the radius filler 300 from the forming die 404 (FIG. 18). The fabric layer 382 may advantageously encase the radius filler 300 to allow for straining between the radius filler 300 and the surrounding stiffener elements 204 and thereby reduce or prevent the propagation of microcracks from the radius filler 300.

After forming the radius filler 300, the method may additionally include installing the radius filler 300 (FIG. 3) in a notch region 220 (FIG. 3) of back-to-back stiffener elements 204 which may also be formed of laminated composite plies 352 (FIG. 3) as indicated above. A cap laminate 208 (FIG. 3) formed of laminated composite plies 352 may be applied to the stiffener flanges 212 (FIG. 3) to encapsulate the radius filler 300 and form a composite stiffener 200. In some examples, the composite stiffener 200 may be pre-cured prior to assembly with one or more composite skin panels 118 (FIG. 3) for co-curing or co-bonding. In other examples, the method may include assembling the uncured composite stiffener 200 (FIG. 3) with one or more uncured skin panels 118, and applying heat and/or pressure and co-curing to form a cured composite assembly 106 (FIG. 3).

Figure 21:
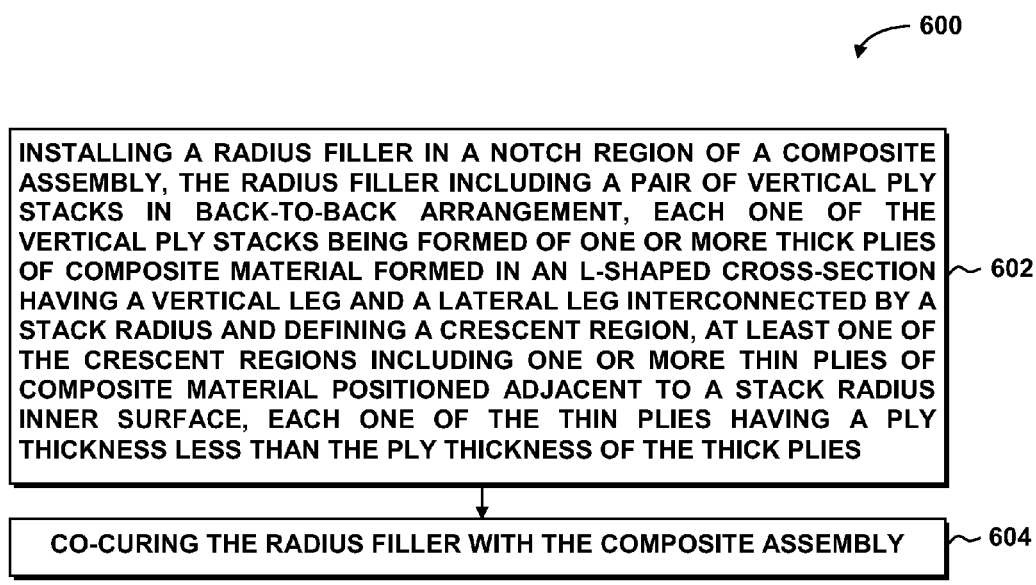
FIG. 21 is an illustration of a flowchart having one or more operations that may be included in a method of manufacturing a composite assembly.

Referring to FIG. 21, shown is a method 600 of forming a composite assembly 106. Step 602 of the method may include installing a radius filler 300 in a notch region 220 of the composite assembly 106 as shown in FIG. 3. As indicated above, the notch region 220 (FIG. 4) may be bounded by opposing stiffener radii 214 (FIG. 3) of back-to-back stiffener elements 204 formed of laminated composite plies 352. As described above, the radius filler 300 may include back-to-back vertical ply stacks 312 (FIG. 3) formed of one or more thick plies 314 (FIG. 3) of composite material 108 in an L-shaped cross-section 316, and may include one or more thin plies 330 of composite material 108 (FIG. 3) positioned adjacent to a stack radius inner surface 324 within the crescent regions 328 (FIG. 3). In some examples, the radius filler 300 may further include an inner noodle 378 filling an inner notch 376 (FIG. 4) bounded by opposing stack radii 322 of the back-to-back vertical ply stacks 312.

The method may optionally include assembling a cap laminate 208 to the stiffener elements 204 (FIG. 3) to encapsulate the radius filler 300 (FIG. 3) in the notch region 220 as shown in FIG. 3 and form a composite stiffener 200. In some examples, the composite stiffener 200 with the cap laminate 208 (FIG. 3) may be assembled with one or more skin panels 118 (e.g., see FIG. 3). In other examples, the cap laminate 208 may be omitted and the composite stiffener 200 may be assembled to one or more composite skin panels 118 (FIG. 3).

Step 604 of the method may include co-curing the radius filler 300 (FIG. 3) with the stiffener elements 204 (FIG. 3) by applying heat and/or pressure to the assembly. In other examples, the uncured composite stiffener 200 (FIG. 3) including the radius filler 300, stiffener elements 204, and cap laminate 208 (FIG. 3) may be pre-cured and then assembled with one or more uncured composite skin panels 118. The cured composite stiffener 200 may be co-bonded with the uncured composite skin panels 118 (FIG. 3) to form a cured composite assembly 106 (FIG. 3).

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A radius filler for a composite assembly, comprising:
   a pair of vertical ply stacks positioned in back-to-back relation to one another, each one of the vertical ply stacks being formed of one or more thick plies of composite material formed in an L-shaped cross-section having a vertical leg and a lateral leg interconnected by a stack radius and defining a crescent region;
   at least one of the crescent regions including one or more thin plies of composite material positioned adjacent to a stack radius inner surface; and
   each one of the thin plies having a ply thickness less than the ply thickness of the thick plies.

2. The radius filler of claim 1, wherein:
   the one or more thin plies are oriented such that a thin ply longitudinal edge is abutting a stack radius inner surface of at least one of the vertical ply stack.

3. The radius filler of claim 1, wherein:
the thin plies of at least one of the vertical ply stack are arranged in a thin ply stack canted at a skew angle non-parallel to the vertical leg and the lateral leg.

4. The radius filler of claim 3, wherein:
the thin plies are arranged in a thin ply stack oriented such that a thin ply surface faces the stack radius inner surface of at least one of the vertical ply stack.

5. The radius filler of claim 3, wherein:
the thin ply stack is a radial thin ply stack configured complementary having an thin ply stack inner radius formed complementary to a stiffener radius outer surface joining a stiffener flange to a stiffener web.

6. The radius filler of claim 1, wherein:
the thin plies have a ply thickness of approximately 50 percent of the ply thickness of the thick plies.

7. The radius filler of claim 1, wherein:
at least one of the thick plies and thin plies having a fiber orientation non-parallel to a lengthwise direction of the radius filler.

8. The radius filler of claim 1, wherein:
the composite material is pre-preg unidirectional slit tape.

9. The radius filler of claim 1, wherein:
at least one of the thick plies and thin plies has at least one of the following ply widths: 0.125 inch, 0.25 inch, 0.375 inch, 0.50 inch.

10. The radius filler of claim 1, wherein:
the radius filler has a variable cross-sectional shape along a lengthwise direction of the radius filler; and
the variable cross-sectional shape formed by at least one of a ply drop and a ply addition in at least one of the thick plies and the thin plies.

11. The radius filler of claim 1, further including:
an inner noodle filling an inner notch having a triangular shape and bounded by opposing stack radii of the back-to-back vertical ply stacks.

12. The radius filler of claim 1, further including:
a fabric layer wrapped around the radius filler.

13. An aircraft, comprising:
a composite structure containing a radius filler including:
    a pair of vertical ply stacks positioned in back-to-back relation to one another, each one of the vertical ply stacks being formed of one or more thick plies of composite material formed in an L-shaped cross-section having a vertical leg and a lateral leg interconnected by a stack radius and defining a crescent region;
    at least one of the crescent regions including a thin ply stack of thin plies of composite material positioned adjacent to a stack radius inner surface; and
    each one of the thin plies having a ply thickness less than the ply thickness of the thick plies.

14. A method of forming a radius filler, comprising the steps of:
positioning a pair of vertical ply stacks in back-to-back relation to one another, each one of the vertical ply stacks being formed of one or more thick plies of composite material formed in an L-shaped cross-section having a vertical leg and a lateral leg interconnected by a stack radius and defining a crescent region;
positioning one or more thin plies of composite material in the crescent region adjacent to a stack radius inner surface of at least one of the vertical ply stacks; and
each one of the thin plies having a ply thickness less than the ply thickness of the thick plies.

15. The method of claim 14, wherein the step of positioning one or more thin plies in the crescent region comprises:
orienting the one or more thin plies such that a thin ply longitudinal edge is abutting a stack radius inner surface of at least one of the vertical ply stack.

16. The method of claim 15, wherein the step of orienting the one or more thin plies includes:
canting one or more of the thin plies of at least one of the vertical ply stack at a skew angle non-parallel to the vertical leg and the lateral leg.

17. The method of claim 14, wherein the step of positioning one or more thin plies in the crescent region comprises:
orienting one or more of the thin plies of at least one of the vertical ply stack such that a thin ply surface faces a stack radius inner surface of at least one of the vertical ply stacks.

18. The method of claim 17, wherein the step of orienting one or more of the thin plies includes:
arranging a plurality of thin plies in a radial thin ply stack.

19. The method of claim 14, further including:
arranging at least one of the thick plies and thin plies such that a fiber orientation is non-parallel to a lengthwise direction of the radius filler.

20. The method of claim 14, further including:
varying a cross-sectional shape of the radius filler along a lengthwise direction by adding or dropping at least one of the thick plies of a vertical ply stack and a thin ply of a thin ply stack in the crescent region.

21. The method of claim 14, further including:
installing an inner noodle in an inner notch bounded by opposing stack radii of back-to-back vertical ply stacks.

22. The method of claim 14, further including:
wrapping a fabric layer around the radius filler.

23. A method of forming a composite assembly, comprising the steps of:
installing a radius filler in a notch region of a composite assembly, the notch region bounded by opposing stiffener radii of back-to-back stiffener elements formed of laminated composite plies, the radius filler including:
    a pair of vertical ply stacks positioned in back-to-back relation to one another, each one of the vertical ply stacks being formed of one or more thick plies of composite material formed in an L-shaped cross-section having a vertical leg and a lateral leg interconnected by a stack radius and defining a crescent region;
    at least one of the crescent regions including one or more thin plies of composite material positioned adjacent to a stack radius inner surface; and
    each one of the thin plies having a ply thickness less than the ply thickness of the thick plies.

24. The method of claim 23, wherein the radius filler further includes:
an inner noodle filling an inner notch bounded by opposing stack radii of back-to-back vertical ply stacks.

25. The method of claim 23, further including:
assembling a cap laminate with the stiffener elements to encapsulate the radius filler in the notch region.

26. The method of claim 23, further including:
co-curing the radius filler with the stiffener elements.

* * * * *